United States Patent
Li et al.

(10) Patent No.: US 9,813,309 B2
(45) Date of Patent: Nov. 7, 2017

(54) METHOD, APPARATUS, AND SYSTEM FOR DETERMINING A LOCATION CORRESPONDING TO AN IP ADDRESS

(71) Applicant: Alibaba Group Holding Limited, George Town (KY)

(72) Inventors: Xiaojian Li, Hangzhou (CN); Manhuo Hong, Hangzhou (CN)

(73) Assignee: Alibaba Group Holding Limited (KY)

( * ) Notice: Subject to any disclaimer, the term of this patent is extended or adjusted under 35 U.S.C. 154(b) by 403 days.

(21) Appl. No.: 14/657,691

(22) Filed: Mar. 13, 2015

(65) Prior Publication Data

US 2015/0264008 A1  Sep. 17, 2015

(30) Foreign Application Priority Data

Mar. 17, 2014 (CN) .......................... 2014 1 0098749

(51) Int. Cl.
*G06F 15/16* (2006.01)
*H04L 12/26* (2006.01)
*G06Q 10/10* (2012.01)
*H04L 29/12* (2006.01)

(52) U.S. Cl.
CPC ............. *H04L 43/00* (2013.01); *G06Q 10/10* (2013.01); *H04L 29/12* (2013.01); *H04L 61/00* (2013.01); *H04L 61/6004* (2013.01); *H04L 61/609* (2013.01); *H04L 61/6068* (2013.01)

(58) Field of Classification Search
CPC ......... H04L 43/00; H04L 29/12; H04L 61/00; H04L 61/6004; H04L 61/609; H04L 61/6068; G06Q 10/10
See application file for complete search history.

(56) References Cited

U.S. PATENT DOCUMENTS

| 6,757,740 | B1 | 6/2004 | Parekh et al. |
| 6,980,566 | B2 | 12/2005 | Melick et al. |
| 7,657,655 | B2 | 2/2010 | Hampton |
| 9,026,145 | B1 * | 5/2015 | Duleba ................... H04L 61/25 455/456.3 |
| 9,113,294 | B2 | 8/2015 | Zhang et al. |
| 9,197,595 | B1 * | 11/2015 | Sandler ................... H04L 67/18 |
| 2005/0021853 | A1 | 1/2005 | Parekh et al. |

(Continued)

FOREIGN PATENT DOCUMENTS

EP        2323350        5/2011

*Primary Examiner* — Jonathan Bui
(74) *Attorney, Agent, or Firm* — Van Pelt, Yi & James LLP

(57) ABSTRACT

Determining a location corresponding to an Internet Protocol (IP) address includes collecting an IP address and location information corresponding to the IP address, wherein the location information corresponding to the IP address includes information identifying a location from which a terminal associated with the IP address accesses a network, obtaining one or more pieces of IP address geographic coordinate data for the IP address using the IP address and the location information corresponding to the IP address, determining geographic coordinates corresponding to the IP address based at least in part on the one or more pieces of IP address geographic coordinate data, determining an IP address field based at least in part on the geographic coordinates corresponding to the IP address, and determining a location corresponding to the IP address field.

24 Claims, 11 Drawing Sheets

(56) References Cited

U.S. PATENT DOCUMENTS

| | | | |
|---|---|---|---|
| 2005/0071417 A1 | 3/2005 | Taylor et al. | |
| 2006/0168164 A1 | 7/2006 | Lemson et al. | |
| 2008/0243822 A1 | 10/2008 | Campbell et al. | |
| 2009/0037602 A1* | 2/2009 | Patel | H04L 29/12047 709/245 |
| 2009/0245114 A1* | 10/2009 | Vijayaraghavan | H04L 41/5009 370/241 |
| 2010/0002700 A1* | 1/2010 | Simpson, Jr. | H04L 29/12783 370/392 |
| 2011/0153681 A1* | 6/2011 | Peng | H04L 29/12047 707/803 |
| 2013/0031033 A1 | 1/2013 | Prieditis | |
| 2013/0053057 A1 | 2/2013 | Cansino et al. | |
| 2013/0159804 A1* | 6/2013 | Suzue | H04L 67/22 714/746 |
| 2013/0297782 A1* | 11/2013 | Oura | G06F 21/10 709/224 |
| 2015/0095124 A1* | 4/2015 | Felt | G06Q 30/0259 705/14.5 |
| 2015/0201298 A1* | 7/2015 | Zhang | H04W 64/00 455/456.1 |
| 2016/0006628 A1* | 1/2016 | Herring | H04L 41/0618 709/224 |

* cited by examiner

METHOD, APPARATUS, AND SYSTEM FOR DETERMINING A LOCATION CORRESPONDING TO AN IP ADDRESS

CROSS REFERENCE TO OTHER APPLICATIONS

This application claims priority to People's Republic of China Patent Application No. 201410098749.4 entitled A METHOD AND A DEVICE FOR DETERMINING IP ADDRESS FIELDS AND THE GEOGRAPHIC COORDINATES CORRESPONDING THERETO, filed Mar. 17, 2014 which is incorporated herein by reference for all purposes.

FIELD OF THE INVENTION

The present application relates to a field of Internet technology. In particular, the present application relates to a method and a device for determining Internet Protocol (IP) address fields and geographic coordinates corresponding thereto.

BACKGROUND OF THE INVENTION

According to some related art, an IP address of a device can be used to infer a geographic location of a user. In online systems, the use of IP addresses of user terminals to infer user geographic location has broad applications. For example, the user geographic location can be inferred from the IP address of a device for use in online information display, application monitoring, network diagnosis, and the like. As an example, in the display of online information, if a user's IP address (e.g., the IP address of the device used by the user) can be used to accurately infer the user's geographic location, then display information near the user's geographic location (e.g., information relating to movie theaters, restaurants, and shopping places near the user's location) can be displayed on a website. The determination (e.g., inference) of a user's geographic location using an IP address of a device requires an IP address and a geographic coordinate information database (e.g., a mapping of IP addresses to geographic coordinate information). There are approximately 4.2 billion IP addresses included in the exhausted IPv4 addresses. Accordingly, if the geographic coordinate information corresponding to each IP address was directly used, the IP address and geographic coordinate information database used to infer a user's geographic location would require approximately 4.2 billion records. The use of so much data online would result in very large performance stresses. For example, the efficiency associated with querying such an IP address and geographic coordinate information database would be very low. According to some related art, in order to reduce the performance stress associated with querying a database for determining a geographic location associated with an IP address, the IP address is generally divided (e.g., segmented) into fields according to the first three numbers in an IP address having a dot-decimal format. However, such segmentation of an IP address is nothing more than simply delineating fields according to IP address quantities without any indication or knowledge of the geographic coordinates corresponding to each delineated field of the IP address. In addition, IP addresses are not delineated based on geographic locations. Accordingly, such segmentation of an IP address has significant limitations for use in connection with location service applications.

To summarize the above, there is a need for a scheme to divide IP addresses into fields, to associate geographic locations with an IP address field, and to determine the geographic location corresponding to each IP address field in order to increase IP address querying efficiency.

BRIEF DESCRIPTION OF THE DRAWINGS

Various embodiments of the invention are disclosed in the following detailed description and the accompanying drawings.

The drawings described here are intended to further the understanding of the present application and form a part of this application. The illustrative embodiments of the present application and the descriptions thereof are intended to explain this application and do not constitute inappropriate limitation of the present application. Among the drawings.

DETAILED DESCRIPTION

Figure 1:
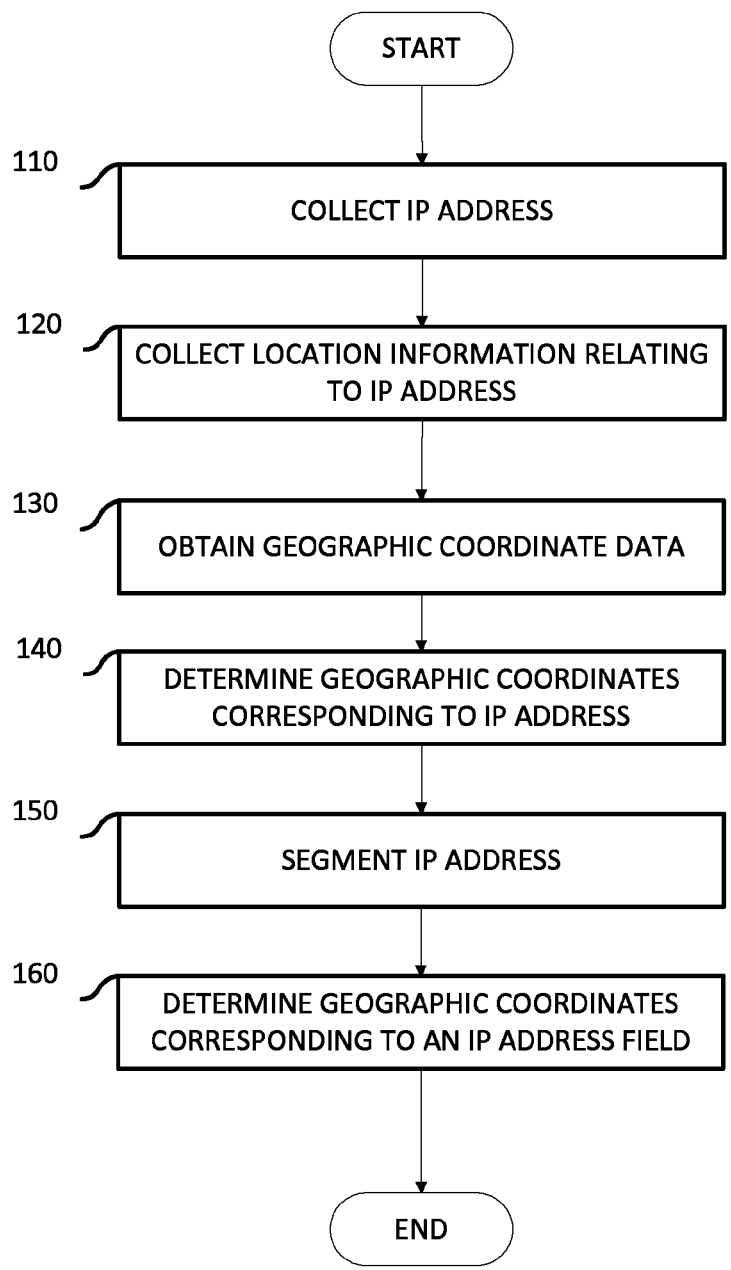
FIG. 1 is a flowchart of a method for determining IP address fields and geographic coordinates corresponding thereto according to various embodiments of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of the present disclosure include a method, an apparatus, and a system for segmenting Internet Protocol (IP) addresses. Various embodiments of the present disclosure include a method, an apparatus, and a system for determining geographic coordinates associated with at least part of (e.g., a segment of) an IP address.

A terminal generally refers to a device used (e.g., by a user) within a network system and used to communicate with one or more servers. According to various embodiments of the present disclosure, a terminal may include communication functionality. For example, a terminal may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), or the like.

According to some embodiments of the present disclosure, a terminal includes a smart home appliance with communication functionality. A smart home appliance can be, for example, a television, a Digital Video Disk (DVD) player, an audio device, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, or the like.

According to various embodiments of the present disclosure, a terminal can be any combination of the foregoing devices. In addition, it will be apparent to one having ordinary skill in the art that a terminal according to various embodiments of the present disclosure is not limited to the foregoing devices.

According to various embodiments of the present disclosure, a large number of IP address geographic location information is collected for the latest time interval. In some embodiments, weights of one or more pieces of IP address geographic coordinate information corresponding to each collected IP address are determined. In some embodiments, the weights of one or more pieces of IP address geographic coordinate information are used as a basis to determine the geographic coordinates corresponding to the corresponding IP address. In some embodiments, the collected (or acquired) IP addresses (e.g., corresponding to a received message) are divided (e.g., segmented) into fields according to a distance between the geographic coordinates corresponding to each IP address so as to obtain the geographic coordinates corresponding to each IP address field. In some embodiments, the IP address field is a set or collection of one or more IP addresses (e.g., a range of IP addresses). For example, an IP address field is a group of IP addresses. The set or collection of IP addresses that correspond to a particular IP address field can be deemed to have a common location.

A method, a system, or a terminal for determining IP address fields and the geographic coordinates corresponding thereto is disclosed in relation to some embodiments of the present disclosure.

FIG. 1 is a flowchart of a method for determining IP address fields and geographic coordinates corresponding thereto according to various embodiments of the present disclosure.

Referring to FIG. 1, a method 100 for determining IP address fields and geographic coordinates corresponding thereto is provided. In some embodiments, the method 100 is implemented by system 800 of FIG. 8. In some embodiments, the method 100 is implemented by server 820 of system 800 of FIG. 8. In some embodiments, the method 100 is implemented by device 900 of FIG. 9.

At 110, an IP address is collected. In some embodiments, a server may collect the IP address. In some embodiments, a plurality of IP addresses is collected. For example, the server may collect the IP address in connection with a received message (e.g., an access request, a response, or the like). In some embodiments, the server may collect the IP address from a terminal that is accessing the Internet (e.g., sending a message such as an access request, a response, or the like). In some embodiments, the server acquires or otherwise extracts the IP address associated with a received message. For example, the IP address can be included in metadata associated with the received message.

At 120, location information relating to (e.g., associated with) an IP address is collected. For example, the location information relating to the collected IP address is collected. In some embodiments, location information relating to each collected IP address is collected. In some embodiments, the location information is collected according to a mapping of at least a part of the IP address to a corresponding location information. In some embodiments, the server collects the location information. For example, the server can retrieve the location information from a database (e.g., an existing data storage comprising a mapping or other relationship between an IP address and corresponding location information that is commercially available such as www.ip2location.com). In some embodiments, the server determines the location information based at least in part on the collected IP address. In some embodiments, the location information is included in a received message (e.g., an access request, a response, or the like). For example, the location information associated with a corresponding IP address can be included as metadata in the message. The message can be sent (e.g., to the server) in connection with a terminal accessing the Internet.

In some embodiments, 110 and 120 are performed contemporaneously. For example, the server can collect an IP address and corresponding location information contemporaneously (e.g., using the same message that is received from a terminal or the like).

In some embodiments, the location information associated with an IP address (e.g., IP address location information) includes geographic coordinate information of the geographic location when the Internet is accessed via the IP address (e.g., in the event that any terminal accesses the Internet via said IP address). For example, the geographic coordinate information can correspond to the geographic coordinates (longitude and latitude) of the location of the terminal.

In some embodiments, an IP address (e.g., associated with a terminal accessing the Internet) and the location information associated with the IP address are collected within a predetermined time of the current time point. For example, the IP addresses associated with Internet accesses (e.g., by a terminal) of the last 30 days and the location information of each IP address are collected. In some embodiments, the location information associated with each IP address includes geographic coordinate information (e.g., the latitude and longitude.) The geographic coordinate information can correspond to a plurality of pieces. For example, each piece of the geographic coordinate information can correspond to at least a part of the geographic coordinates of the locations of a terminal when the terminal accessed the Internet at different times via the IP address.

At 130, geographic coordinate data is obtained. In some embodiments, the server obtains (e.g., determines) the geographic coordinate data. The geographic coordinate data can correspond to the location of the terminal (e.g., the terminal accessing the Internet). The server can obtain the geographic coordinate data by determining a location corresponding to the collected IP address (e.g., the IP address of the terminal accessing the Internet). For example, each collected IP address and each piece of the corresponding IP address location information can be processed to obtain one or more pieces of the IP address geographic coordinate data corresponding to each collected IP address.

In some embodiments, the geographic coordinate information included in the location information of each collected IP address may undergo processing in order for the IP address geographic coordinate data corresponding to each IP address to be obtained. For example, the server can determine the IP address geographic coordinate data corresponding to an IP address by using the location information associated with the collected IP address. In some embodiments, the location information associated with each IP address includes one or more pieces of geographic coordinate information. Accordingly, in some embodiments, obtaining one or more pieces of IP address geographic coordinate data corresponding to each IP address is possible. In some embodiments, each piece of the IP address geographic coordinate data includes the IP address and a set of longitudinal and latitudinal data corresponding to the IP address.

At 140, geographic coordinates corresponding to the IP address are determined. In some embodiments, the server determines the geographic coordinates corresponding to each IP address based at least in part on the one or more pieces of the IP address geographic coordinate data corresponding to each IP address.

In some embodiments, a weight of each piece of IP address geographic coordinate data associated with the one or more pieces of the IP address geographic coordinate data corresponding to each collected IP address is determined. The server can determine a weighting associated with each corresponding piece of the IP address geographic coordinate data that is included with the one or more pieces of the IP address geographic coordinate data. In some embodiments, the geographic coordinates corresponding to the IP address are determined to be the geographic coordinates associated with the IP address geographic coordinate data having the greatest weight among the one or more pieces of IP address geographic coordinate data corresponding to the IP address.

At 150, a set of collected IP addresses is segmented. In some embodiments, IP addresses are segmented (e.g., divided) into fields according to the geographic coordinates corresponding to the IP address. In some embodiments, multiple IP address fields are obtained based at least in part on the segmenting of the IP addresses. In some embodiments, an IP address field can correspond to a set of IP addresses that is determined based on a degree of similarity of the IP addresses within a particular set of IP addresses. For example, the IP addresses in a set of IP addresses can have a degree of similarity such that the IP addresses have a location within a predetermined threshold distance (e.g., a predetermined threshold distance between each pair of IP addresses in the set of IP addresses that are closest to each other, a predetermined threshold distance between geographic coordinate data between the geographic locations of the pair of IP addresses having a greatest distance therebetween, or the like). In some embodiments, an IP address field can correspond to a range of IP addresses that are determined based at least in part on a degree of similarity of the IP addresses in the range of IP addresses. For example, the IP addresses in a range of IP addresses can have a degree of similarity such that the IP addresses have a location within a predetermined threshold distance (e.g., a predetermined threshold distance between each pair of IP addresses in the range of IP addresses that are closest to each other, a predetermined threshold distance between geographic coordinate data between the geographic locations of the pair of IP addresses having a greatest distance therebetween, or the like).

In some embodiments, the collected IP addresses can be ranked according to a predetermined order. In some embodiments, the distances (e.g., the geographic distance) between the geographic coordinates of each pair of adjacent IP addresses (e.g., when the IP addresses are ranked or arranged according to the predetermined order) can be determined. The IP address fields can be determined according to the distances between the corresponding geographic coordinates. For example, the collected IP addresses can be segmented according to the distance between the corresponding geographic coordinates. As an example, multiple IP address fields can be obtained based on the segmentation of the collected IP addresses into IP address fields according to the distances between the corresponding geographic coordinates. In some embodiments, the predetermined order can correspond to a mapping of IP addresses to numbers and then ordering according to the mapped numbers from small to large. As an example, the numbers to which the IP addresses are mapped can be integers. As another example, the integers to which the IP addresses are mapped can represent a range of numbers for the number of IP addresses. For example, in the event that ten IP addresses exist, each IP address can be mapped to an integer from 1 to 10 based at least in part on the ranking of each IP address according to the predetermined order.

At 160, geographic coordinates corresponding to an IP address field are determined. In some embodiments, the geographic coordinates corresponding to each IP address field in the multiple IP address fields are determined. For example, the geographic coordinates corresponding to each IP address field resulting from the segmenting of the IP addresses are determined. In some embodiments, the server can determine the geographic coordinates corresponding to an IP address field.

In some embodiments, the geographic coordinates corresponding to each IP address field may be determined according to the geographic coordinates of one or more IP addresses included in each IP address field. For example, the longitudinal data and latitudinal data in one or more pieces of the IP address geographic coordinate data (e.g., associated with each particular IP address) included in each IP address field may be separately averaged. In some embodiments, the mean longitude coordinate and latitude coordinate corresponding to a particular IP address field can be determined to be the geographic coordinates corresponding to the particular IP address field. In some embodiments, the longitudinal data and latitudinal data in one or more pieces of the IP address geographic coordinate data included in IP address fields may be averaged across the corresponding IP address fields of a particular IP address so as to derive average geographic coordinates for the IP address. The average geographic coordinates may correspond to a median, a mean, or the like of the corresponding longitudinal data and latitudinal data.

A method of the present application for determining geographic coordinates corresponding to IP addresses is described below.

Figure 2:
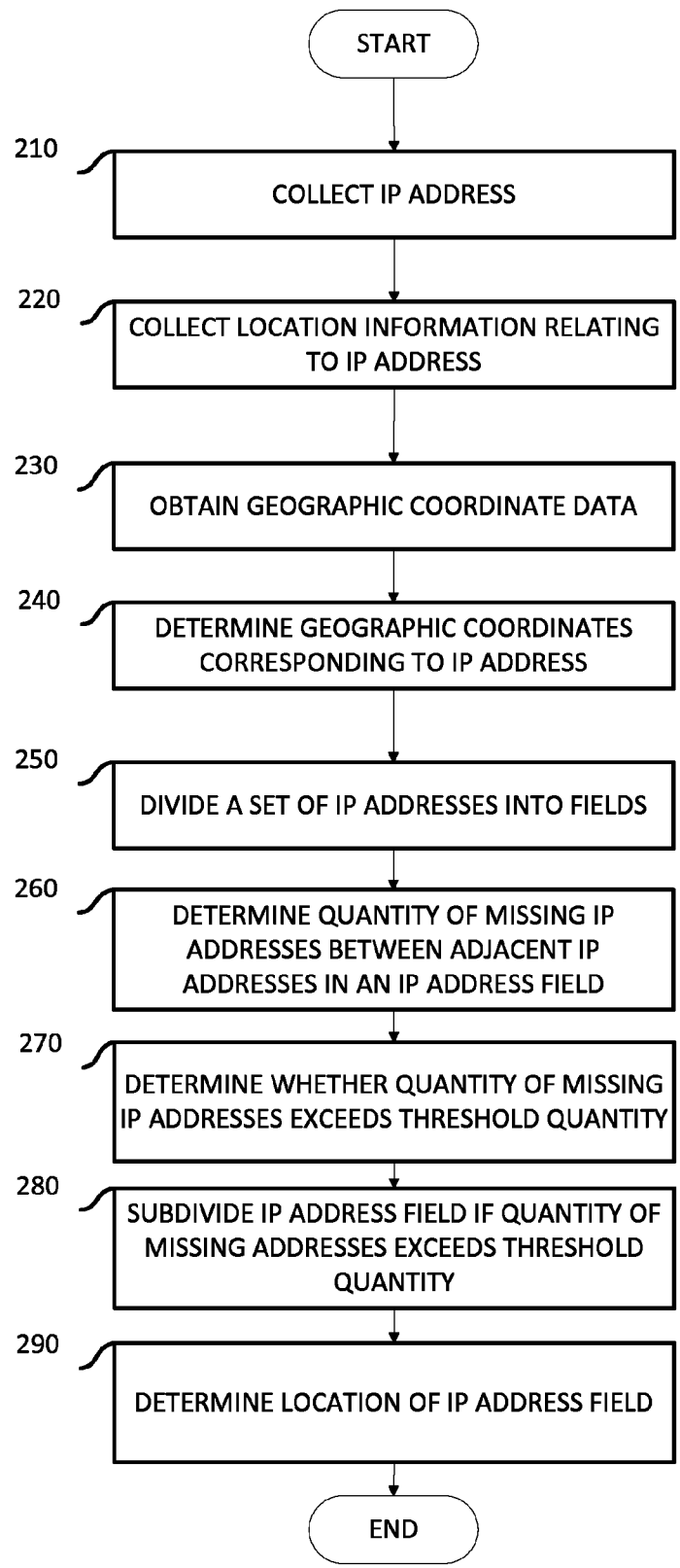
FIG. 2 is a flowchart of a method for determining IP address fields and the geographic coordinates corresponding thereto according to various embodiments of the present disclosure.

FIG. 2 is a flowchart of a method for determining IP address fields and the geographic coordinates corresponding thereto according to various embodiments of the present disclosure.

Referring to FIG. 2, a method 200 for determining IP address fields and the geographic coordinates corresponding thereto is provided. In some embodiments, the method 200 is implemented by system 800 of FIG. 8. In some embodiments, the method 200 is implemented by sever 820 of system 800 of FIG. 8. In some embodiments, the method 200 is implemented by device 900 of FIG. 9.

At 210, an IP address is collected. In some embodiments, a server may collect the IP address. In some embodiments, a plurality of IP addresses is collected. For example, the server may collect the IP address in connection with a received message (e.g., an access request, a response, or the like). In some embodiments, the server may collect the IP address from a terminal that is accessing the Internet (e.g., sending a message such as an access request, a response, or the like). In some embodiments, the server acquires or otherwise extracts the IP address associated with a received message. For example, the IP address can be included in metadata associated with the received message.

At 220, location information relating to (e.g., associated with) an IP address is collected. For example, the location information relating to the collected IP address is collected. In some embodiments, location information relating to each collected IP address is collected. In some embodiments, the location information is collected according to a mapping of at least a part of the IP address to a corresponding location information. In some embodiments, the server collects the location information. For example, the server can retrieve the location information from a database (e.g., that stores an existing mapping or other relationship between an IP address and corresponding location information). In some embodiments, the server determines the location information based at least in part on the collected IP address. In some embodiments, the location information is included in a received message (e.g., an access request, a response, or the like). For example, the location information associated with a corresponding IP address can be included as metadata in the message. The message can be sent (e.g., to the server) in connection with a terminal accessing the Internet. This level of location information is imprecise and further processing is needed to determine the location more precisely.

In some embodiments, 210 and 220 are performed contemporaneously. For example, the server can collect an IP address and corresponding location information contemporaneously (e.g., using the same message that is received from a terminal or the like).

In some embodiments, the IP address location information (e.g., the location information corresponding to a particular IP address) includes geographic coordinate information of the corresponding geographic locations when the Internet is accessed via the particular IP address (e.g., when any terminal accesses the Internet via the particular IP address). In some embodiments, the geographic coordinate information includes the geographic coordinates corresponding to the location of the terminal when the terminal accesses the Internet.

In view of the time sensitivity of data (e.g., the time sensitivity associated with providing a user of the terminal with information relevant to the geographic location of the terminal), the Internet access IP addresses and the location information of each IP address can be collected within a predetermined time distance of the current time point (e.g., a point in time when the terminal is accessing the Internet, or the server receives an access request, response, or other message from the terminal). In some embodiments, the IP addresses for Internet accesses of the last (e.g., preceding) 30 days and the location information of each IP address are collected. The server can store location information corresponding to each access of the Internet by one or more IP addresses over a threshold period of time. The location information corresponding to each access of the Internet can be stored in a database storing a location information and IP address mapping history. Such a database is available commercially from certain Internet service providers (e.g., a database can be retrieved or otherwise accessed at www.ip2location.com). Because IP addresses are dynamically allocated (e.g., by a server to terminals), the location (geographic coordinates) of each IP address may vary according to different Internet access events (e.g., on different days). Therefore, in some embodiments, one or more pieces of geographic coordinate information can be obtained for each of the one or more IP addresses. For example, one or more pieces of geographic coordinate information may be included in the location information of each IP address. As an example, between January 1-January 10, the IP address 1.2.3.4 corresponds to the latitude/longitude coordinates of (10 degrees North, 20 degrees West), and between January 11-January 31 the same IP address corresponds to the latitude/longitude coordinates of (15 degrees North, 25 degrees West). Accordingly, two pieces of data for an IP address over the one month period are collected. In some embodiments, each piece of geographic coordinate information corresponds to the geographic coordinates of the location of a terminal when the terminal accessed the Internet via the IP address at a different time. For example, one or more pieces of coordinate information can be included in the location information corresponding to each Internet access event by a particular IP address.

At 230, geographic coordinate data is obtained. In some embodiments, the server obtains (e.g., determines) one or more pieces of the geographic coordinate data corresponding to an IP address. The geographic coordinate data can correspond to the location of the terminal (e.g., the terminal accessing the Internet). The server can obtain the geographic coordinate data by determining a location corresponding to the collected IP address (e.g., the IP address of the terminal accessing the Internet). For example, each collected IP address and each piece of the IP address location information can be processed to obtain one or more pieces of the IP address geographic coordinate data corresponding to each collected IP address.

In some embodiments, the geographic coordinate information included in the location information of each collected IP address may undergo processing in order for the IP address geographic coordinate data corresponding to each IP address to be obtained. For example, the server can determine the IP address geographic coordinate data corresponding to an IP address by using the location information associated with the collected IP address. In some embodiments, the location information of each IP address includes one or more pieces of geographic coordinate information. Accordingly, the location information of each IP address can be processed (e.g., analyzed) to obtain one or more pieces of IP address geographic coordinate data corresponding to the IP address. In some embodiments, each piece of the IP address geographic coordinate data includes the IP address and a set of longitudinal and latitudinal data for the IP address. For example, any one piece of geographic coordinate information in the location information of an IP address can be processed to obtain a piece of the IP address geographic coordinate data corresponding to the IP address. In some embodiments, the format of the IP geographic coordinate data is [ip, lat, log], wherein "ip" represents the IP address, "lat" represents latitude, and "log" represents longitude. In some embodiments, the latitudinal data and the longitudinal data can be processed according to a predetermined method in order to attain a certain precision of the location. For example, the last three digits after the decimal point can be retained (e.g., the three places following the decimal point can be captured) in the longitudinal data and in the latitudinal data to ensure a reasonable error margin for the actual geographic location corresponding to each set of geographic coordinate data (e.g., 0.01 degree geographic coordinate error within 1 km).

In some embodiments, pieces of the IP address geographic coordinate data that have an occurrence day count less than a predetermined day count can be eliminated, or otherwise discounted, from the processing of the IP address geographic coordinate data. For example, a piece of IP address geographic coordinate data that is included in IP address and corresponding location information for only one day can be excluded from the IP address geographic coordinate data used to determine location of the terminal. The occurrence day count can be obtained by counting the number of times when the devices of an IP address (e.g., smartphones using the same WiFi hotspot) report the devices' locations. The piece of IP address geographic coordinate data that is included in IP address and corresponding location information for only one day can be considered as abnormal data and thus is excluded or otherwise deleted. In some embodiments, the server excludes geographic coordinate data associated with a particular IP address if the particular IP address was not associated with the geographic coordinate data for greater than a threshold period of time (e.g., if the terminal accessed the Internet from a particular location less than a threshold number of times, less than a threshold frequency, or the like).

At 240, geographic coordinates corresponding to the IP address are determined. In some embodiments, the server determines the geographic coordinates corresponding to an IP address based at least in part on the one or more pieces of the IP address geographic coordinate data corresponding to the collected IP address. For example, in some embodiments, the geographic coordinates corresponding to each IP address are determined on the basis of one or more pieces of the IP address geographic coordinate data corresponding to each collected IP address.

At 250, a set of IP addresses is divided into fields. In some embodiments, the server divides the set of IP addresses into fields (e.g., a set of IP addresses, a range of IP addresses, or the like). The collected IP addresses can be divided into the fields. In some embodiments, the set of IP addresses is divided into fields based at least in part on the geographic coordinates associated with the IP address. For example, IP addresses are divided into fields according to the geographic coordinates corresponding to each IP address. Accordingly, multiple IP address fields are thereby obtained.

Figure 3:
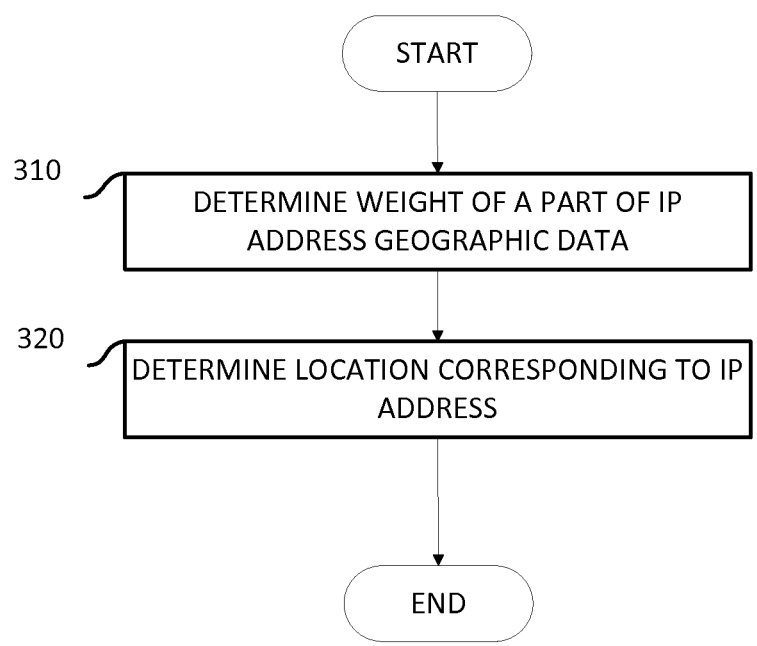
FIG. 3 is a flowchart of a method for determining a geographic coordinate corresponding to an IP address on the basis of one or more pieces of IP address geographic coordinate data corresponding to an IP address according to various embodiments of the present disclosure.

In some embodiments, method 300 illustrated in FIG. 3 is implemented as at least a part of 240 of FIG. 2.

FIG. 3 is a flowchart of a method for determining a geographic coordinate corresponding to an IP address on the basis of one or more pieces of IP address geographic coordinate data corresponding to an IP address according to various embodiments of the present disclosure.

Referring to FIG. 3, a method 300 for determining a geographic coordinate corresponding to an IP address on the basis of one or more pieces of IP address geographic coordinate data corresponding to the IP address is provided. In some embodiments, the method 300 is included in 240 of FIG. 2. In some embodiments, the method 300 is implemented by system 800 of FIG. 8. In some embodiments, the method 300 is implemented by server 820 of system 800 of FIG. 8. In some embodiments, the method 300 is implemented by device 900 of FIG. 9.

In some embodiments, the method 300 is implemented for determining the geographic coordinates corresponding to each IP address based at least in part on one or more pieces of IP address geographic coordinate data corresponding to each IP address.

At 310 a weight of a piece of IP address geographic data is determined. In some embodiments, the server determines the weight of the piece of the IP address geographic data. In some embodiments, the weight of each piece of the IP address geographic coordinate data corresponding to the IP address is determined for a plurality of IP addresses. In some embodiments, the weight of each piece of the IP address geographic coordinate data corresponding to the IP address is determined for each IP address. For example, the weight of each piece of the IP address geographic coordinate data among the one or more pieces of the IP address geographic coordinate data corresponds to each collected IP address. Details of how to determine the weight are described in connection with FIG. 4.

Figure 4:
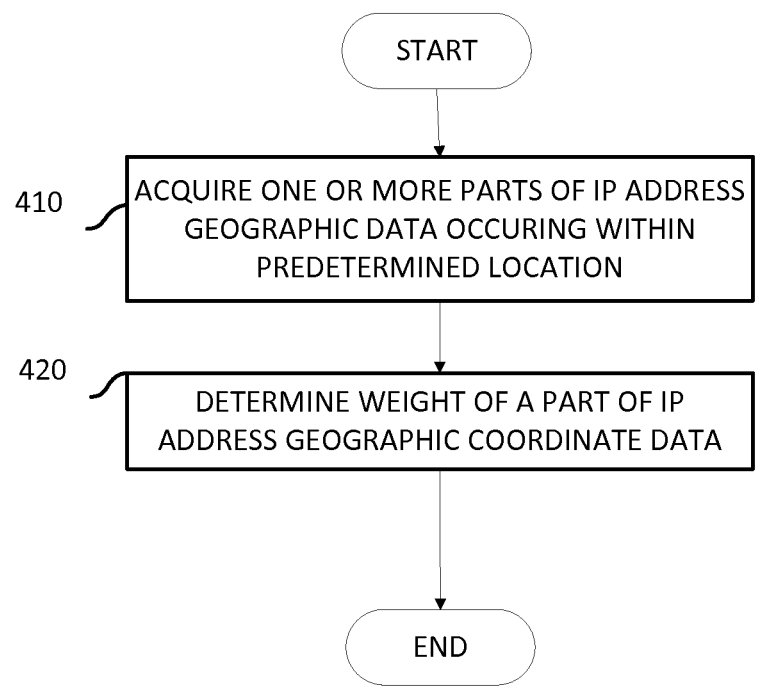
FIG. 4 is a flowchart of a method for determining a weight of a piece of IP address geographic coordinate data corresponding to an IP address according to various embodiments of the present disclosure.

FIG. 4 is a flowchart of a method for determining a weight of a piece of IP address geographic coordinate data corresponding to an IP address according to various embodiments of the present disclosure. In some embodiments, method 400 illustrated in FIG. 4 is used to implement 310 of FIG. 3.

Referring to FIG. 4, method 400 for determining a weight of a piece of IP address geographic coordinate data corresponding to an IP address is provided. In some embodiments, the method 400 is included in 310 of FIG. 3. In some embodiments, the method 400 is implemented by system 800 of FIG. 8. In some embodiments, the method 400 is implemented by server 820 of system 800 of FIG. 8. In some embodiments, the method 400 is implemented by device 900 of FIG. 9.

In some embodiments, the method 400 is implemented for determining the weight of each piece of IP address geographic coordinate data corresponding to each IP address.

At 410, one or more pieces of IP address geographic data are acquired. In some embodiments, the one or more pieces of IP address geographic data occurring within a predetermined location are acquired. In some embodiments, the server acquires the one or more pieces of IP address geographic data occurring with the predetermined location. The one or more pieces of IP address geographic data occurring within a predetermined location can correspond to IP address geographic data that occurs within a threshold distance of a location. In some embodiments, the predetermined location corresponds to a location associated with an IP address collected from a terminal that is accessing the network. In some embodiments, the predetermined location corresponds to a location corresponding to geographic coordinates in each piece of IP address geographic coordinate data corresponding to the IP address.

In some embodiments, one or more pieces of IP address geographic coordinate data that occur within a predetermined range of locations corresponding to each piece of IP address geographic coordinate data corresponding to the IP address are acquired. As an example, the threshold distance can correspond to 2 kilometers. For example, all the IP address geographic coordinate data occurring within 2 kilometers of locations corresponding to geographic coordinates in each piece of IP address geographic coordinate data corresponding to the IP address can be acquired.

At 420, a weight of a piece of IP address geographic coordinate data is determined. In some embodiments, the server determines the weight of the piece of IP address geographic coordinate data. In some embodiments, the weight of the piece of IP address geographic coordinate data is determined according to a number of days on which one or more pieces of IP address geographic coordinate data occur within a predetermined range of locations corresponding to the each piece of IP address geographic coordinate data. In some embodiments, the weight of each piece of IP address geographic coordinate data is determined according to the amount of time (e.g., determined on the basis of a number of days) for which the one or more pieces of IP address geographic coordinate data occur within a predetermined location (e.g., within the predetermined range of locations) corresponding to each piece of the IP address geographic coordinate data.

In some embodiments, the weighting of a piece of IP address geographic coordinate data may be further determined based at least in part on whether a particular piece of IP address geographic coordinate data is recent. For example, a piece of IP address geographic coordinate data that is not recent (e.g., occurred within the past 30 days) can be excluded from a calculation of the weight of a piece of address geographic coordinate data. In some embodiments, the piece of IP address geographic coordinate data can be determined to be recent according to a date of an access of the Internet for a particular IP address corresponding to the piece of IP address geographic coordinate data. As an example, in the event that the IP address geographic coordinate data is associated with an access of the Internet corresponding to a date that is greater than a threshold number of days from the determination of the weight, then such IP address geographic coordinate data is excluded from the determination of the weight.

In some embodiments, the number of days on which each piece of IP address geographic coordinate data occurs among one or more pieces of IP address geographic coordinate data occurring within a predetermined range of locations corresponding to each piece of IP address geographic coordinate data is summed to obtain the total number of days corresponding to each piece of IP address geographic coordinate data corresponding to the IP address. Thereafter, the total number of days corresponding to each piece of IP address geographic coordinate data serves as a basis for determining the weight of each piece of IP address geographic coordinate data (e.g., corresponding to a different location).

In some embodiments, the occurrence of an access event for accessing the Internet from a particular location of one or more pieces of IP address geographic coordinate data corresponding to each collected IP address may be counted to obtain a day count for all IP address geographic coordinate data corresponding to a particular IP address. In some embodiments, the occurrence of IP address geographic coordinate data within a day (e.g., any day within a predetermined time from the current time such as the time at which the weight of the piece of the IP address geographic coordinate data is determined) is recorded as an occurrence of an access event for accessing the Internet from a particular location (e.g., for a day). In some embodiments, multiple access events for accessing the Internet from a particular location will be counted as (e.g., considered as) a single access event for accessing the Internet of the day on which the access event occurs. For example, regardless of how many times the data occurs (e.g., regardless of the number of access events for accessing the Internet) on a particular day, the IP geographic coordinate data for that day will be recorded as a single occurrence of the access event for accessing the Internet. For example, in the event that 30 days of IP geographic coordinate data are collected, and a particular IP address geographic coordinate data occurs 5 times on day 1 (e.g., the Internet is accessed by a terminal using the particular IP address from a particular location 5 times on day 1) and once each on day 5 and day 26, the occurrence day count for the particular IP address geographic coordinate data will be recorded as 3 days. In some embodiments, if a device using a particular IP address accesses the Internet from different locations on the same day, then the location at which the device using the particular IP address accesses the Internet more times (e.g., a location corresponding to a higher day count in connection with the particular IP address) is used as the location corresponding to the particular IP address on that day. In some embodiments, if a device using a particular IP address accesses the Internet from different locations on the same day, and if more than one location at which the device accessed the Internet using the particular IP address corresponds to a location having a maximum day count for that particular IP address on that day, then the location corresponding to the particular IP address for that day is randomly chosen among the locations having the maximum day count for that particular IP address on that day.

Returning to FIG. 3, at 320, a location corresponding to an IP address is determined. In some embodiments, the server determines the location corresponding to the IP address. The location of the IP address can correspond to geographic coordinates (e.g., coordinates that identify the latitude and longitude of a location). In some embodiments, the location corresponding to the IP address can be determined based at least in part on the weighting of each piece of the IP address coordinate data corresponding to the IP address. In some embodiments, the geographic coordinates corresponding to the IP address are determined on the basis of the weight of each piece of IP address geographic coordinate data corresponding to the IP address.

In some embodiments, the geographic coordinates in the IP address geographic coordinate data having the greatest weight among the one or more pieces of IP address geographic coordinate data corresponding to the IP address are determined to be (e.g., considered to be) the geographic coordinates corresponding to the IP address. In some embodiments, the location of a particular IP address is determined to be an average (e.g., a median, a mean, or the like) of a plurality of geographic coordinates in the IP address geographic coordinate data among the one or more pieces of the IP address geographic coordinate data corresponding to the particular IP address. For example, an average of the geographic coordinates in the IP address geographic coordinate data of the one or more pieces of the IP address geographic coordinate data corresponding to the IP address corresponding to a threshold number of pieces of the IP address geographic coordinate data having the relatively high weights are determined to be (e.g., considered to be) the geographic coordinates corresponding to the IP address.

Figure 5:
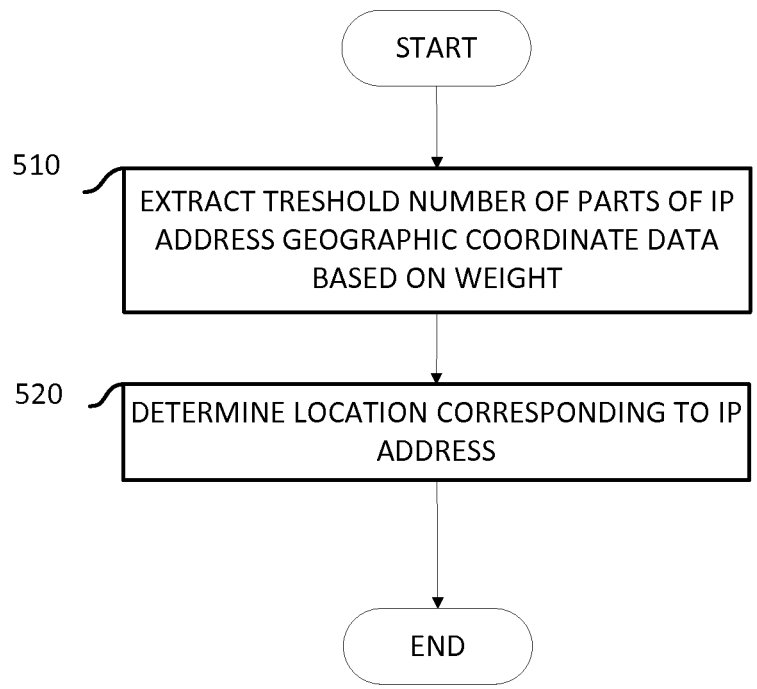
FIG. 5 is a flowchart of a method for determining geographic coordinates corresponding to an IP address on a basis of a weight of a piece of IP address geographic coordinate data corresponding to the IP address according to various embodiments of the present disclosure.

In some embodiments, method 500 illustrated in FIG. 5 is implemented as at least a part of 320 of FIG. 3.

FIG. 5 is a flowchart of a method for determining geographic coordinates corresponding to an IP address on a basis of a weight of a piece of IP address geographic coordinate data corresponding to the IP address according to various embodiments of the present disclosure.

Referring to FIG. 5, method 500 for determining a weight of a piece of IP address geographic coordinate data corresponding to an IP address is provided. In some embodiments, the method 500 is included in 320 of FIG. 3. In some embodiments, the method 500 is implemented by system 800 of FIG. 8. In some embodiments, the method 500 is implemented by server 820 of FIG. 8. In some embodiments, the method 500 is implemented by device 900 of FIG. 9.

In some embodiments, the method 500 is implemented for determining the geographic coordinates corresponding to the IP address on the basis of the weight of each piece of IP address geographic coordinate data corresponding to the IP address.

At 510, a threshold number of pieces of the IP address geographic coordinate data is extracted (e.g., acquired, retrieved, or the like) based at least in part on a respective weight of the pieces of the IP address geographic coordinate data. In some embodiments, the server extracts the threshold number of pieces of the IP address geographic coordinate data. In some embodiments, the threshold number is three. For example, the three pieces of IP address geographic coordinate data having the greatest weight among one or more pieces of IP address geographic coordinate data corresponding to the IP address are extracted.

The respective weights of one or more pieces of IP address geographic coordinate data corresponding to the IP address are ranked so as to extract therefrom the threshold number of (e.g., three) pieces of IP address geographic coordinate data having the greatest weight. For example, after one or more pieces of IP address geographic coordinate data corresponding to a particular IP address are ranked according to their respective weights from large to small, the threshold number of pieces of IP address geographic coordinate data having the largest weight is extracted. The threshold number of pieces of IP address geographic coordinate data can be extracted from the ranked data corresponding to the first threshold number of pieces of IP address geographic data based on weights ranked from a large weight to a small weight. In some embodiments, data corresponding to an IP address geographic coordinate data is extracted from the ranked data based on weight such that extracting the data includes iteratively extracting data corresponding to IP address geographic data having a highest weight (e.g., until a threshold number of pieces are extracted from the ranked data).

At 520, a location corresponding to an IP address is determined. In some embodiments, the server determines the location corresponding to the IP address. In some embodiments, the location corresponding to the IP address corresponds to geographic coordinates (e.g., coordinates that identify a latitude and longitude of the location). The geographic coordinates corresponding to the IP address can be determined based on the weights of the threshold number (e.g., three) of largest-weight pieces of IP address geographic coordinate data and distances between the corresponding locations.

The distances from the IP address geographic coordinate data having the largest weight among the threshold number of largest-weight pieces of IP address geographic coordinate data that were extracted in relation to the locations of the other of the threshold number of pieces of IP address geographic coordinate data that were extracted can be determined. For example, in the event that the threshold number is three, then the sever can determine the respective distances of the pieces of IP address geographic coordinate data having the second and third largest weights among the threshold number of largest-weight pieces of IP address geographic coordinate data that were extracted in relation to the location of the other of the IP address geographic coordinate data having the largest weight among the threshold number of largest-weight pieces of IP address geographic coordinate data that were extracted. A weighted average can be computed on (i) longitudinal data and latitudinal data of IP address geographic coordinate data having a distance from the location corresponding to the piece of IP address geographic coordinate data of the largest-weight piece of the IP address coordinate data that does not exceed a predetermined distance and (i) the longitudinal data and the latitudinal data of the piece of the IP address geographic coordinate data of the largest-weight piece the IP address geographic coordinate data. The computed weighted average (e.g., the longitudinal mean and the latitudinal mean) can be considered to be the geographic coordinates corresponding to the IP address.

For example, in the event that the threshold number is three, the three largest-weight pieces of IP address geographic coordinate data extracted from an IP address are a1 (e.g., which has the largest weight), a2 (e.g., which has the second largest weight) and a3 (e.g., which has the third largest weight), wherein a1=[ip, lat1, log 1], a2=[ip, lat2, log 2], and a3=[ip, lat3, log 3]. In this example, a predetermined distance of 2 km is set. The distances from a1 to the locations corresponding to the other two pieces of IP address geographic coordinate data (e.g., a2 and a3) are separately calculated. In the event that the calculated distance between a1 and the location corresponding to a2 is within 2 km, and if the distance between a1 and the location corresponding to a3 is also less than 2 km, then the longitudinal data and the latitudinal data in a1, a2 and a3 are separately weighted and averaged according to the weights of a1, a2 and a3. The calculated weighted average (e.g., the calculated longitudinal mean and latitudinal mean) can serve as the geographic coordinates corresponding to the IP address. In the event that the distance between a1 and the location corresponding to a2 is less than or equal to 2 km, and the distance between a1 and the location corresponding to a3 is greater than 2 km, then the longitudinal data and the latitudinal data in a1 and a2 are separately weighted and averaged according to the weights of a1 and a2, while the IP address geographic coordinate data for a3 is excluded in determining the weighting of the various one or more pieces of the IP address geographic coordinate data. In some embodiments, the calculated average of the IP address geographic coordinate data corresponding to a1 and a2 using the respective weights for a1 and a2 is considered the geographic coordinates corresponding to the IP address. For example, the longitudinal mean and latitudinal mean serve as the geographic coordinates corresponding to the IP address. In the event that both the obtained distances a1-a2 and a1-a3 are greater than 2 km (e.g., the respective distances of a2 and a3 from a1 are greater than the predetermined distance), then the geographic coordinates of the largest-weight a1 can be regarded as the geographic coordinates corresponding to the IP address.

Figure 6:
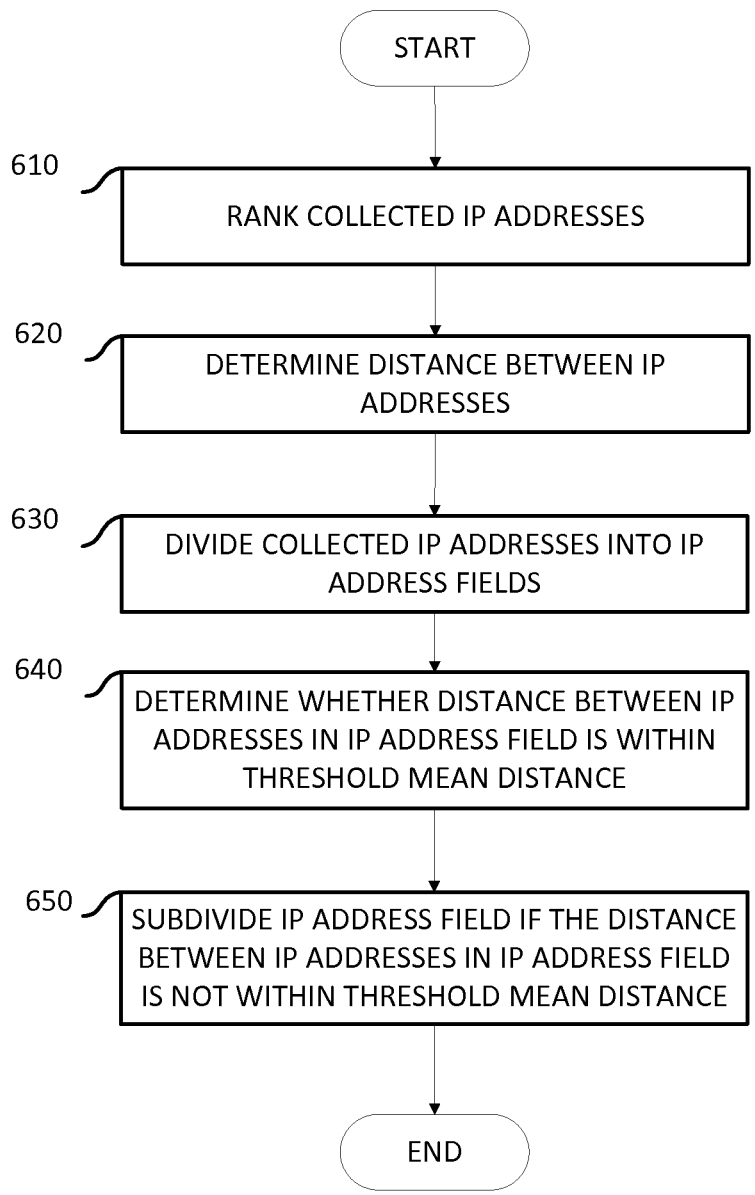
FIG. 6 is a flowchart of a method for dividing IP addresses into fields according to geographic coordinates corresponding to an IP address and for obtaining multiple IP address fields according to various embodiments of the present disclosure.

FIG. 6 is a flowchart of a method for dividing IP addresses into fields according to geographic coordinates corresponding to an IP address and for obtaining multiple IP address fields according to various embodiments of the present disclosure.

Referring to FIG. 6, a method 600 for dividing IP addresses into fields according to geographic coordinates corresponding to an IP address and for obtaining multiple IP address fields is provided. In some embodiments, the method 600 is included in 250 of FIG. 2. For example, in some embodiments, the method 600 illustrated in FIG. 6 is implemented as at least a part of 250 of FIG. 2. In some embodiments, the method 600 is implemented by system 800 of FIG. 8. In some embodiments, the method 600 is implemented by server 820 of FIG. 8. In some embodiments, the method 600 is implemented by device 900 of FIG. 9.

At 610, the collected IP addresses are ranked. In some embodiments, the server ranks the collected IP addresses. In some embodiments, the collected IP addresses are ranked according to a predetermined order. In some embodiments, the predetermined order corresponds to mapping IP addresses to numbers (e.g., integers) and then ordering according to the mapped numbers from small to large. In some embodiments, the mapping of IP addresses to numbers includes considering the four segments of the IP address as the four bytes of an integer. For example, an integer value is derived from mapping the four segments of the IP address to a corresponding byte of an integer.

At 620, a distance between the geographic coordinates of IP addresses is determined. In some embodiments, the server determines the distance between the geographic coordinates of IP addresses. In some embodiments, the distances between the geographic coordinates corresponding to each pair of adjacent IP addresses are determined. A pair of adjacent IP addresses can correspond to IP addresses that are logically next to one another in relation to the rankings of the collected IP addresses. In some embodiments, the collected IP addresses are converted into a numerical value that represents the individual IP address in a base-ten format. For example, the collected addresses can be converted from dot-format base-ten IP addresses to numerical IP addresses (e.g., that are not divided into fields by decimal points).

In some embodiments, 610 and 620 are performed contemporaneously. For example, the server can rank the collected IP addresses according to a predetermined order and determine the distance between the geographic coordinates of IP addresses contemporaneously.

In some embodiments, the collected IP addresses are ranked from small to large according to the magnitude of the actual numerical value of each IP address. The distances between the geographic coordinates corresponding to each pair of IP addresses that is adjacent in the rankings can be determined. For example, the geographic coordinates corresponding to each pair of adjacent IP addresses (e.g., as determined by the ranking) are used to calculate the distances between the locations (e.g., points on a spherical surface) corresponding to the geographic coordinates corresponding to these paired IP addresses.

According to TCP/IP protocol, IP addresses are composed of 32-bit binary numbers. The 32-bit binary number of the IP address is generally divided into four fields to generate an IP address that is easier to remember. Each segment of the IP address (e.g., each segment of the divided 32-bit binary number of the address) has 8 bits. Each segment of the IP address is separated by a decimal point. Thereafter, the 8-bit binary number of each segment is converted to a base-10 number. Accordingly, the IP address is expressed in the form of "a.b.c.d." In other words, the IP address is represented as a base-ten number and is divided by decimal points. Each of the numbers that is defined by the position of the decimal points (e.g., a, b, c and d) in the IP address that is represented as a base-ten number is a base-ten integer between 0 and 255. The original 32-bit binary number of the IP address can be converted to a base-ten number and a numerical IP address corresponding to an IP address that is represented as a base-ten number and is divided by decimal points can be obtained.

In some embodiments, the collected IP addresses can be represented as dot-format base-ten IP addresses. In some embodiments, the collected IP addresses can be represented as numerical IP addresses (e.g., the original 32-bit binary number of the IP address). The collected IP addresses can be ranked according to a magnitude of a number of the IP address's numerical IP address. In the event that the collected IP addresses are represented as dot-format addresses, then each IP address can first be converted into a numerical IP address. For example, the dot-format base-ten IP address "100.4.5.6" can first be converted into a 32-bit binary number "01100100 00000100 00000101 00000110." The 32-bit binary number (e.g., corresponding to the dot-format base-ten IP address) is then converted into a base-ten number 1677985030. The numerical IP address of 1677985030 can be obtained from the base-ten number converted from the 32-bit binary number for this IP address. Thereafter, the collected addresses are ranked according to the numerical value magnitudes of the numerical IP addresses.

At 630, the collected IP addresses are divided into IP address fields. In some embodiments, the server divides the collected IP addresses into the IP address fields. In some embodiments, the IP address fields can respectively correspond to a set of IP addresses. In some embodiments, the IP address fields can respectively correspond to a range of IP addresses. The collected IP addresses can be divided into IP address fields according to the distances between the geographic coordinates corresponding to a pair of IP addresses. In some embodiments, the collected IP addresses are divided into IP address fields according to the distances between the geographic coordinates corresponding to each pair of adjacent IP addresses. A plurality of IP address fields can be obtained according to the division of the collected IP addresses into the IP address fields.

The collected IP addresses can be divided using the method below into IP address fields according to the distances between the geographic coordinates corresponding to said each pair of adjacent IP addresses so as to obtain multiple IP address fields. In some embodiments, the method for dividing the collected IP addresses into the IP address fields includes (i) regarding the smaller IP address of the two adjacent IP addresses which are the nth pair of IP addresses whose adjacent distance exceeds a predetermined distance as the ending IP address of the nth IP address field, (ii) regarding the larger IP address of the two adjacent IP addresses which are the (n−1)th pair of IP addresses whose adjacent distance exceeds a predetermined distance as the beginning IP address of that IP address field, and (iii) determining therefrom the nth IP address field, wherein n is an integer greater than or equal to 1 and wherein, when n is equal to 1, the first IP address is regarded as the starting IP address of the first IP address field.

For example, the collected IP addresses put in order of increasing magnitude are: 1, 3, 16, 20, 23, 25, 28, . . . . Beginning with the first IP address 1, the distances between the geographic coordinates of each pair of adjacent IP addresses are sequentially determined. The predetermined distance is assumed to be set at 2 km. The distance between the geographic coordinates of each pair of IP addresses is started in relation to the first IP address. In this example, none of the distances between the geographic coordinates corresponding to the adjacent IP addresses 1 and 3, the adjacent IP addresses 3 and 16, and the adjacent IP addresses 16 and 20 exceeds 2 km. In the event that the distance between the geographic coordinates corresponding to IP address 20 and IP address 23 is determined to exceed 2 km, the IP address pair of the adjacent IP addresses 20 and 23 corresponds to the first adjacent pair with a distance that exceeds the predetermined distance. IP address 20 is the smaller of the IP address pair of adjacent IP addresses 20 and 23. Accordingly, IP address 20, which is the smaller of IP address 20 and IP address 23, is regarded as the ending IP address of the first IP address field. IP address 1 serves as the starting IP address of the 1st IP address field. That is, IP addresses 1, 3, 16 and 20 belong to the same IP address field (e.g., the first IP address field). The segmentation of the collected IP addresses into IP address fields is continued from IP address 23 onwards. In some embodiments, segmentation of the collected IP addresses into a plurality of IP address fields clusters subsets of IP addresses of the collected IP addresses into groups wherein each of the IP addresses of a particular group have a corresponding location that is relatively close to the other IP addresses of the particular group. The predetermined distance serves as a threshold distance for determining the IP addresses that are relatively close.

In some embodiments, each obtained IP address field can be recorded in, or otherwise represented by, the form of [startIP, endIP]. "start IP" can represent the beginning IP address of the IP address field and "endIP" can represent the ending IP address of the IP address field. For example, the IP addresses included in an IP address field for a certain point (e.g., location) are arranged in increasing order as IP address 1, 3, 16 and 20. According to this example, the starting IP address is IP address 1, and the ending IP address is IP address 20. Accordingly, the IP address field can be recorded as [1, 20]. Moreover, in the event that the magnitude of an IP address is between the starting IP address and the ending IP address of an IP address field or in the event that the IP address is the starting IP address or the ending IP address of the IP address field, the IP address can be confirmed as belonging to the IP address field. In some embodiments, the uncollected IP addresses (e.g., IP addresses that are not collected IP addresses) having IP addresses (e.g., a numerical representation of the IP address) between the starting IP address and ending IP address of each IP address field are also considered to belong to the IP address field. According to statistical analysis, there is a greater possibility that continuous IP addresses will be allocated in nearby locations. Therefore, the uncollected IP addresses that are between the starting IP address and the ending IP address of each IP address field may be approximately regarded as belonging to the IP address field (e.g., and thus as having the same location). As an example, IP address 15 is not a collected IP address in the example described above. However, IP address 15 is between the starting IP address and the ending IP address of IP address field [1,20]. Thus, it can be determined that the IP address 15 belongs to IP address field [1,20], and the geographic coordinates of IP address 15 can be determined according to the geographic coordinates corresponding to the IP address field [1,20].

In some embodiments, in order to avoid situations in which IP addresses in an obtained IP address field are strung together in a straight line, the IP address field is sub-divided into fields. The IP addresses in an obtained IP address field can be considered to be strung together in a straight line in the event that none of the distances between the geographic coordinates of each pair of adjacent IP addresses within an IP address field exceeds the predetermined distance, yet the distances between one or more of the IP addresses from the geographic coordinates of non-adjacent IP addresses within the IP address field do exceed the predetermined distance. In the event that the IP addresses in a particular IP address field are strung together in a straight line, the IP addresses in the particular IP address field can exhibit a connected-series trend. In the event that the IP addresses in the particular IP address field exhibit a connected-series trend, the particular address field can be sub-divided into fields.

In some embodiments, the method 600 can further include 640 and 650. For example, 640 and 650 may be further included in method 600 of FIG. 6 following 630.

At 640, a distance between at least two IP addresses in an IP address field is compared to a threshold mean distance. In some embodiments, the server computes the distance between the at least two IP addresses and compares a mean of the computed distances to the threshold mean distance. The comparison of the mean of the computed distances between the at least two IP addresses and the threshold mean distance can be computed for each IP address field among the multiple IP address fields. In some embodiments, the mean of the distances between the geographic coordinates corresponding to each IP address in the IP address field and the geographic coordinates corresponding to the IP address before that IP address is sequentially assessed to determine whether the mean of the distances exceeds the threshold mean distance (e.g., a predetermined mean distance).

At 650, in the event that the distance between the IP addresses in an IP address field is not within the threshold mean distance, the IP address field is sub-divided. In some embodiments, the server sub-divides a particular IP address field in the event that the distance between the IP addresses in the particular IP address field is not within the threshold mean distance. In some embodiments, in the event that the mean distance exceeds the threshold mean distance (e.g., the predetermined mean distance), the IP addresses arranged in order in front of the IP address within a particular IP address field are determined to belong to a new IP address field. For example, a particular IP address field is sub-divided to create a new IP address field such that the IP addresses arranged in order in front of the IP address belong to the new IP address field. In some embodiments, the IP address (e.g., the lesser or earlier IP address of the IP address pair having a distance therebetween that exceeds the threshold mean distance) in front of (e.g., adjacent to) the IP address (e.g., the greater or later IP address of the IP address pair having a distance therebetween that exceeds the threshold mean distance) is considered to be the ending IP address of the new IP address field (e.g., the newly created IP address field according to the sub-division of an IP address field) and the starting IP address of the original IP address field is regarded as the starting IP address of the new IP address field. In some embodiments, the IP address and all the IP addresses arranged in order following the IP address are determined to be another new IP address field. The IP address is regarded as the starting IP address of the new IP address field and the ending IP address of the original IP address field is regarded as the ending IP address of that IP address field. In some embodiments, the threshold mean distance (e.g., the predetermined mean distance) is equal to the predetermined distance (e.g., that is used to determine the original IP address fields). In some embodiments, the threshold mean distance is different from the predetermined distance.

As an example, a particular IP address field [IP1, IPn] includes n IP addresses, IP1, IP2, ..., IPk, ..., IPn. The distance between the geographic coordinates corresponding to IP1 and IP2 is within the threshold mean distance. The mean distance between IPk (k<=n) and IP1, IP2, ..., IPk−1 is assessed (e.g., computed or otherwise determined). In the event that the mean distance exceeds the threshold mean distance, then the IP addresses between IP1 and IPk−1 are regarded as a new IP address field [IP1, IPk−1]. The starting IP address IP1 of the original IP address field serves as the starting IP address of the new IP address field and IPk−1 serves as the ending IP address of the new IP address field. The IP addresses between IPk and IPn serve as another new IP address field [IP1, IPk−1]. The determination of whether the mean distance between an IP address in relation to the other IP addresses in a particular IP address field is within the threshold mean distance is continued with the latter new IP address field (e.g., the IP address field represented by IP addresses [IP1, IPk−1] serving as the next IP address field. In the event that the mean distance between the geographic coordinates corresponding to IPk (k<=n) and IP1, IP2, ..., IPk−1 does not exceed the predetermined mean distance, then the comparison mean distance between IPk+1 and IP1, IP2, ..., IPk in relation to the threshold mean distance is continued.

Returning to FIG. 2, in 260, a quantity of missing IP addresses between adjacent IP addresses in an IP address field is determined. In some embodiments, the server determines the quantity of missing IP addresses between adjacent IP addresses in an IP address field. In some embodiments, the quantity of missing IP addresses between each pair of adjacent IP addresses in an IP address field is sequentially measured for each IP address field.

Because the collected IP addresses do not necessarily correspond to all IP addresses, although one IP address field [m,n] (e.g., wherein m and n are numerical IP addresses) should include m−n+1 IP addresses, the quantity of collected IP addresses included in the IP address field [m,n] (e.g., the quantity of IP addresses actually collected) can be smaller than m−n. As an example, the IP address field [1,20] should include 20 IP addresses, however, only 4 IP addresses are actually collected: IP addresses 1, 3, 16 and 20, respectively. According to this example, the only IP addresses actually included in the IP address field [1,20] are 1, 3, 16 and 20. As a result, the number of IP addresses that are missing (e.g., uncollected IP addresses) from the IP address field [1,20] is relatively large. In some embodiments, a threshold quantity (e.g., a predetermined quantity) is set. In some embodiments, the quantity of missing IP addresses between each pair of adjacent IP addresses in the IP address field is sequentially measured. If the quantity of missing IP addresses between each pair of adjacent IP addresses in each IP address field exceeds the threshold quantity, then this IP address field may be sub-divided. For example, the quantities of missing IP addresses between each pair of IP addresses among the IP addresses 1, 3, 16 and 20 contained in IP address field [1,20] are measured in sequence. For example, one IP address is missing between IP addresses 1 and 3; twelve IP addresses are missing between IP addresses 3 and 16; and three IP addresses are missing between IP addresses 16 and 20.

At 270, a determination of whether the quantity of missing IP addresses exceeds the threshold quantity is made. In some embodiments, the server determines whether the quantity of missing IP addresses exceeds the threshold quantity. For example, the server determines whether the quantity of missing IP addresses between a pair of adjacent IP addresses of a particular IP address field exceeds a threshold quantity.

At 280, an IP address field is subdivided in the event that a quantity of missing addresses exceeds a threshold quantity. In some embodiments, the server subdivides the IP address field. In some embodiments, in the event that the measured quantity of missing IP addresses between a pair of adjacent IP addresses exceeds the threshold quantity, then the IP address field (e.g., the IP address field to which the pair of adjacent IP addresses belong) is sub-divided according to the pair of adjacent IP addresses. For example, the IP address field is sub-divided such that one of the pair of newly created IP address fields has an ending IP address that is equal to one of the pair of adjacent IP addresses, and the other newly created IP address field has a beginning IP address that is equal to the other of the pair of adjacent IP addresses.

In the event that the quantity of missing IP addresses between a pair of adjacent IP addresses of a particular IP address field exceeds a threshold quantity, the particular IP address field can be sub-divided into two fields. The particular IP address field can be sub-divided according to the pair of adjacent IP addresses. The IP address that occupies the forward position in the pair of adjacent IP addresses serves as the ending IP address of the forward IP address field of the two newly created IP address fields. The starting IP address of the original IP address field is the starting IP address of the forward field. The IP address that occupies the rear position serves as the starting IP address of the rear IP address field of the two newly created IP address fields. The ending IP address of the original IP address field is the ending IP address of the rear field.

For example, the threshold quantity can be set to 5. According to statistical analysis, the possibility of continuous IP addresses being allocated to nearby locations is relatively high. Therefore, five or fewer missing IP addresses can be roughly regarded as belonging to a same IP address field as the IP addresses between which the missing IP addresses fall. According to this example, the collected IP addresses of the IP address field [1,20] are 1, 3, 16, and 20.

Thus, applying this example of IP address field [1,20], the quantity of missing IP addresses between IP address 1 and IP address 3 is 1, which does not exceed the threshold quantity of 5. The quantity of missing IP addresses between IP address 3 and IP address 16 is 12, which does exceed the threshold quantity of 5. Accordingly, IP address field [1,20] may be divided into IP address fields [1,3] and [16,20]. Then measurement continues sequentially from IP address 16. The quantity of missing IP addresses between IP address 16 and IP address 20 is 3, which does not exceed the predetermined quantity of 5. Therefore, the IP address field [16,20] is not required to be sub-divided.

At 290, the location of an IP address field is determined. In some embodiments, the server determines the location of the IP address field. In some embodiments, the geographic coordinates corresponding to each IP address field among IP address fields are determined.

In some embodiments, the geographic coordinates corresponding to each IP address field may be determined according to the geographic coordinates of one or more IP addresses included in each IP address field. For example, the longitudinal data and latitudinal data corresponding to one or more pieces of IP address geographic coordinate data contained in each IP address field may be separately averaged, and the mean longitude and latitude can be computed. The mean longitude and mean latitude of each IP address field can be respectively considered to be the geographic coordinates corresponding to each IP address field.

In some embodiments, IP addresses are divided into IP address fields and the geographic coordinates corresponding to each IP address field are determined. Accordingly, a relationship between the IP address field and the geographic coordinates can be used to determine the geographic coordinates of any IP address. For example, the geographic coordinates of a particular IP address can be approximated, or otherwise determined, according to the IP address field to which the particular IP address belongs. The approximation or determination of the location of a particular IP address can be applied to various online systems. For example, the approximation or determination of the location of a particular IP address can be applied in pushing increased-precision location-based information on online information display platforms. When a terminal (e.g., a user) browses an online information display platform web page, the location of the user can be inferred from the IP address used by the terminal and nearby location information can be displayed to the user. For example, advertisement information relating to offers and/or vendors within a predetermined threshold proximity of the location of the user can be provided to the user (e.g., to the terminal) and displayed to the user.

Figure 7:
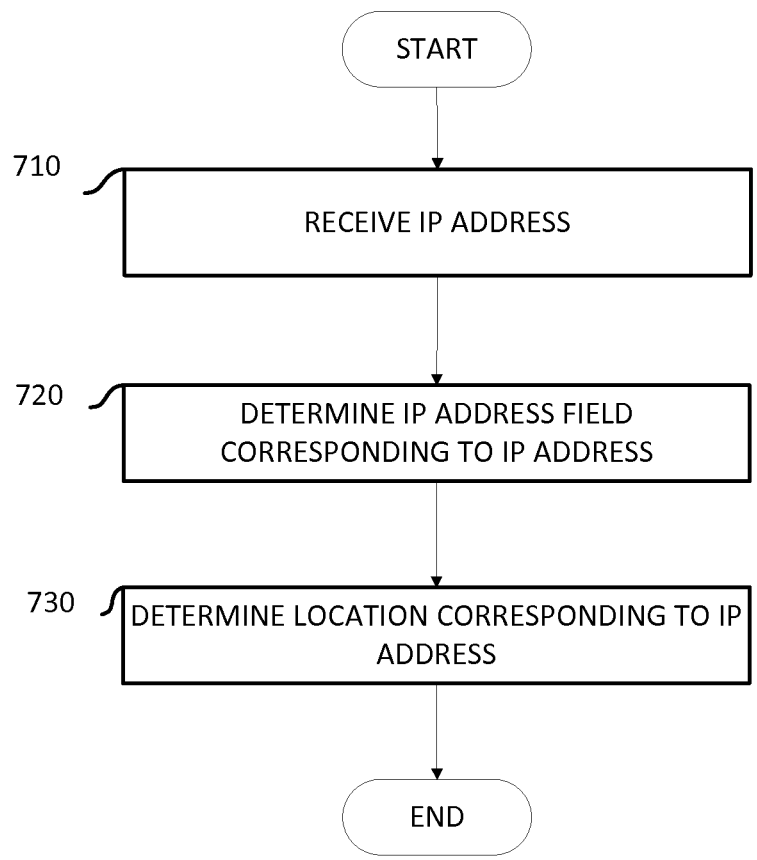
FIG. 7 is a flowchart of a method for determining the geographic coordinates corresponding to IP addresses that are to be measured according to various embodiments of the present disclosure.

FIG. 7 is a flowchart of a method for determining the geographic coordinates corresponding to IP addresses that are to be measured according to various embodiments of the present disclosure.

Referring to FIG. 7, a method 700 for determining IP address fields and the geographic coordinates corresponding thereto is provided. In some embodiments, the method 700 is implemented by system 800 of FIG. 8. In some embodiments, the method 700 is implemented by server 820 of FIG. 8. In some embodiments, the method 700 is implemented by device 900 of FIG. 9. In some embodiments, the method 700 is implemented by device 1000 of FIG. 10.

At 710, an IP address is received. In some embodiments, the server receives an IP address. The IP address can be received in connection with a location-based application or service. For example, the server can receive an IP address for which geographic coordinates are to be determined.

At 720, an IP address field corresponding to the IP address is determined. In some embodiments, the server determines the IP address field corresponding to the received IP address. The IP addresses can be determined to be in an IP address field associated with the multiple IP address fields obtained using one or more of the methods described with reference to FIGS. 1 through 6. In other words, a determination is made as to which IP address field among the multiple IP address fields (e.g., obtained by pre-dividing the IP addresses into fields) the IP address belongs.

At 730, a location corresponding to the IP address is determined. In some embodiments, the server determines the location of the IP address. For example, the server can determine geographic coordinates of a terminal accessing the Internet using the received IP address. The server can determine the geographic coordinates of a terminal according to the IP address field to which the IP address of the terminal belongs. The geographic coordinates corresponding to the IP address field associated with the IP addresses obtained using one or more of the methods described in FIGS. 1 through 6 are determined to be the geographic coordinates corresponding to the IP addresses. For example, the geographic coordinates corresponding to the IP address field associated with those IP addresses for which geographic coordinates are to be determined are confirmed to be the geographic coordinates corresponding to those IP addresses for which geographic coordinates are to be determined. Thus, quickly determining the location of an IP address for which the location is to be determined is possible.

Figure 8:
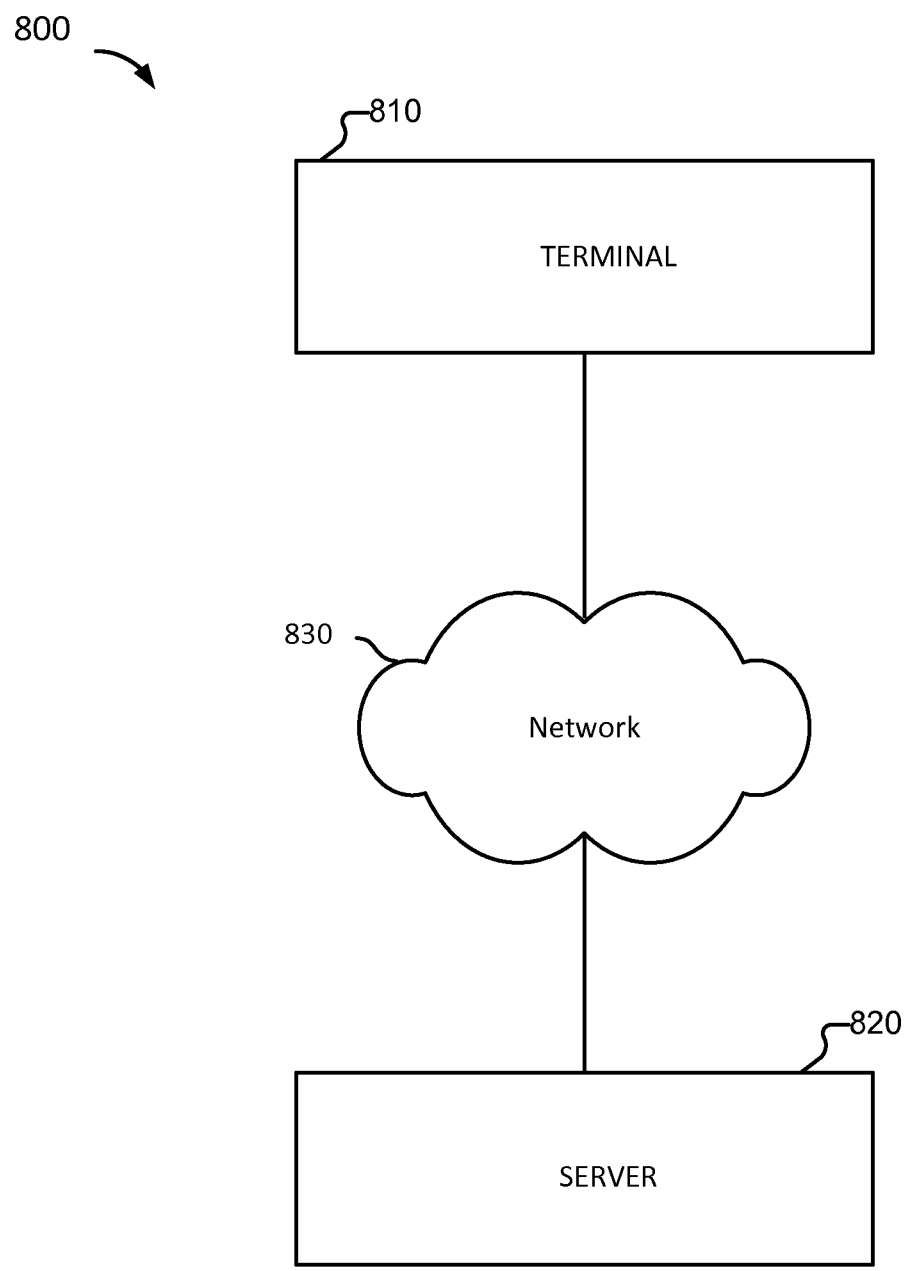
FIG. 8 is a diagram of a system for determining IP addresses according to various embodiments of the present disclosure.

FIG. 8 is a diagram of a system for determining IP addresses according to various embodiments of the present disclosure.

Referring to FIG. 8, a system 800 for determining IP addresses is provided. In some embodiments, the system 800 can implement method 100 of FIG. 1. In some embodiments, the system 800 can implement method 200 of FIG. 2. In some embodiments, the system 800 can implement method 300 of FIG. 3. In some embodiments, the system 800 can implement method 400 of FIG. 4. In some embodiments, the system 800 can implement method 500 of FIG. 5. In some embodiments, the system 800 can implement method 600 of FIG. 6. In some embodiments, the system 800 can implement method 700 of FIG. 7.

The system 800 includes a terminal 810 and a server 820. In some embodiments, the terminal 810 and the server 820 are connected by a network 830 such as the Internet. For example, the terminal 810 can access the server 820 (e.g., or a website hosted by the server 820). The terminal 810 can be assigned an IP address for communicating over the network 830.

In some embodiments, the server 820 can determine a location of the terminal 810 according to an IP address of the terminal 810. The server 820 can determine the location of the terminal 810 in connection with providing a location-based service to the terminal 810. The location-based service can include providing advertisements to the terminal, providing information about vendors or services near the terminal, the like, or any combination thereof.

In some embodiments, the server 820 can determine the location of the terminal 810 by determining an IP address field to which the terminal 810 belongs. An IP address field can correspond to a group of IP address fields having substantially the same location (e.g., geographic coordinates). An IP address field can have a location corresponding thereto such that each IP address belonging to the IP address field is considered to have the same location.

The server 820 can determine the location corresponding to an IP address field according to an average of the locations of the individual IP addresses within the IP address field that are collected.

In some embodiments, the server 820 can implement one or more of the method 100 of FIG. 1, the method 200 of FIG. 2, the method 300 of FIG. 3, the method 400 of FIG. 4, the method 500 of FIG. 5, the method 600 of FIG. 6, and the method 700 of FIG. 7.

Figure 9:
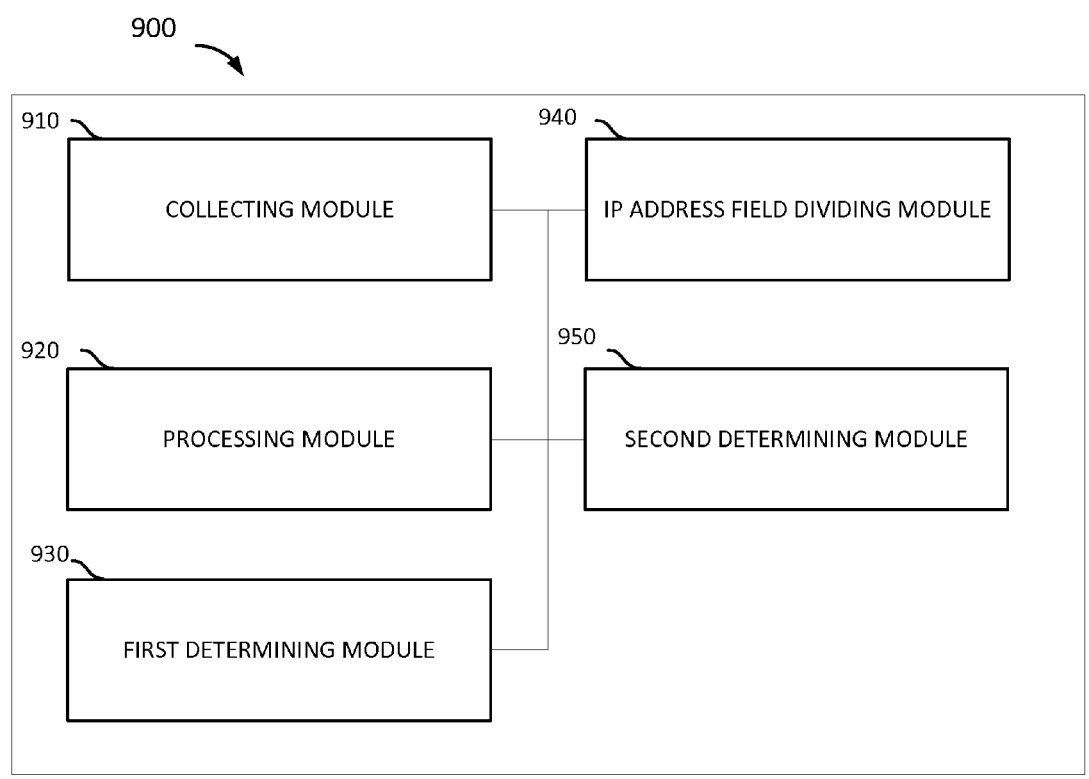
FIG. 9 is a structural diagram of a device for determining IP address fields and geographic coordinates according to various embodiments of the present disclosure.

FIG. 9 is a structural diagram of a device for determining IP address fields and geographic coordinates according to various embodiments of the present disclosure.

Referring to FIG. 9, a device 900 for determining the geographic coordinates corresponding to to-be-measured IP addresses is provided. In some embodiments, the device 900 can implement method 100 of FIG. 1. In some embodiments, the device 900 can implement method 200 of FIG. 2. In some embodiments, the device 900 can implement method 300 of FIG. 3. In some embodiments, the device 900 can implement method 400 of FIG. 4. In some embodiments, the device 900 can implement method 500 of FIG. 5. In some embodiments, the device 900 can implement method 600 of FIG. 6. In some embodiments, the device 900 can implement method 700 of FIG. 7. In some embodiments, the device 900 corresponds to the server 820 of FIG. 8.

In some embodiments, the device 900 includes a collecting module 910, a processing module 920, a first determining module 930, an IP address field dividing module 940, and a second determining module 950.

In some embodiments, the collecting module 910 collects IP addresses and the location information of each IP address. The location information of the IP address can include the geographic coordinates of the location from which the Internet (e.g., by a terminal) was accessed through the IP address.

In some embodiments, the processing module 920 can process each collected IP address and each piece of IP address location information to obtain one or more pieces of IP address geographic coordinate data corresponding to each collected IP address.

In some embodiments, the first determining module 930 can determine the geographic coordinates corresponding to each IP address based at least in part on one or more pieces of IP address geographic coordinate data corresponding to each collected IP address.

In some embodiments, the IP address field dividing module 940 can divide IP addresses into fields according to the geographic coordinates corresponding to each IP address and thereby obtain multiple IP address fields.

In some embodiments, the second determining module 950 can determine the geographic coordinates corresponding to each IP address field in the multiple IP address fields.

In some embodiments, the first determining module 930 can include a weight determining module (not shown). In some embodiments, the first determining module 930 can include a geographic coordinate determining module (not shown).

The weight determining module can determine, for each IP address, the weight of each piece of the IP address geographic coordinate data corresponding to the IP address.

The geographic coordinate determining module can determine the geographic coordinates corresponding to the IP address based at least in part on the weight of each piece of IP address geographic coordinate data corresponding to the IP address.

In some embodiments, the weight determining module includes an acquiring sub-module. In some embodiments, the weight determining module includes a weight determining sub-module.

The acquiring sub-module can acquire the one or more pieces of IP address geographic coordinate data that occur within a predetermined range of locations corresponding to each piece of IP address geographic coordinate data corresponding to the IP address.

The weight determining sub-module can determine the weight of each piece of IP address geographic coordinate data according to the number of days on which one or more pieces of IP address geographic coordinate data occur within a predetermined range of locations corresponding to each piece of IP address geographic coordinate data.

In some embodiments, the geographic coordinate determining module can be further configured to determine that the geographic coordinates in the IP address geographic coordinate data having the greatest weight among the one or more pieces of IP address geographic coordinate data corresponding to the IP address are to be the geographic coordinates corresponding to the IP address.

In some embodiments, the geographic coordinate determining module includes an extracting sub-module. In some embodiments, the geographic coordinate determining module includes a geographic coordinate determining sub-module.

In some embodiments, the extracting sub-module extracts a threshold number of pieces (e.g., three pieces) of IP address geographic coordinate data having the greatest weight among one or more pieces of IP address geographic coordinate data corresponding to the IP address.

In some embodiments, the geographic coordinate determining sub-module determines the geographic coordinates corresponding to the IP address based at least in part on the distances between the locations corresponding to the threshold number of pieces (e.g., the three pieces) of IP address geographic coordinate data having the greatest weight corresponding to the IP address.

In some embodiments, the IP address field dividing module 940 includes one or more of a ranking module (not shown), a distance determining module (not shown), and a field dividing module (not shown).

In some embodiments, the ranking module can rank collected IP addresses according to a predetermined order. The predetermined order can include mapping IP addresses to numbers and then ordering the IP addresses according to the mapped numbers from small to large.

In some embodiments, the distance determining module can determine the distances between geographic coordinates corresponding to every pair of adjacent IP addresses. In some embodiments, a pair of adjacent IP addresses can correspond to IP addresses that are logically next to one another. For example, a pair of adjacent IP addresses can correspond to IP addresses that are logically next to one another in relation to the ordering of the IP addresses based on the mapped numbers.

In some embodiments, the field dividing module can divide the collected IP addresses into IP address fields according to the distances between the geographic coordinates corresponding to each pair of adjacent IP addresses. The field dividing module can obtain multiple IP address fields thereby. In some embodiments, the field dividing module can use the following method to divide all collected IP addresses into IP address fields according to the distances between geographic coordinates corresponding to each pair of adjacent IP addresses and obtain multiple IP address fields. In some embodiments, the method for dividing the collected IP addresses into the IP address fields that is implemented by the field dividing module includes (i) regarding the smaller IP address (e.g., the lesser or earlier IP address) of the two adjacent IP addresses which are the nth pair of IP addresses whose adjacent distance exceeds a predetermined distance as the ending IP address of the nth IP address field, (ii) regarding the larger IP address (e.g., the greater or later IP address) of the two adjacent IP addresses which are the n−1th pair of IP addresses whose adjacent distance exceeds a predetermined distance as the beginning IP address of the IP address field, and (iii) determining therefrom the nth IP address field, wherein n is an integer greater than or equal to 1 and wherein, when n is equal to 1, the first IP address is regarded as the starting IP address of the first IP address field.

In some embodiments, the IP address field dividing module 940 includes an assessing module (not shown) that is configured to determine whether a mean distance between an IP address in the IP address field exceeds a threshold mean distance. For example, the assessing module can be configured to perform the following method on each IP address field among the multiple IP address fields that are obtained: sequentially assessing the mean of the distances between the geographic coordinates corresponding to each IP address in the IP address field and the geographic coordinates corresponding to the IP address before that IP address to determine whether the computed mean distance exceeds a threshold mean distance.

In some embodiments, the field dividing module can be configured to sub-divide an IP address field module based at least in part on whether a computed mean distance between the geographic coordinates corresponding to each IP address in the IP address field and the geographic coordinates corresponding to the IP address before that IP address exceeds a threshold mean distance. In the event that the computed mean distance exceeds the threshold mean distance, then the field dividing module can sub-divide the IP address field such that all the IP addresses arranged in order in front of the IP address within that IP address field are determined to belong to a new IP address field. In some embodiments, the IP address in front of the IP address is considered to be the ending IP address of the new IP address field (e.g., the newly created IP address field according to the sub-division of an IP address field) and the starting IP address of the original IP address field can be regarded as the starting IP address of the new IP address field. In some embodiments, the IP address and all the IP addresses arranged in order following the IP address are determined to be another new IP address field. The IP address is regarded as the starting IP address of the new IP address field and the ending IP address of the original IP address field is regarded as the ending IP address of that IP address field.

In some embodiments, the device 900 includes a measuring module (not shown). The measuring module can be configured to sequentially measure the quantity of missing IP addresses between each pair of adjacent IP addresses in the IP address field. The measuring module can measure the quantity of missing IP addresses between each pair of adjacent IP addresses in the IP address field for each IP address field.

In some embodiments, the field dividing module is configured to sub-divide an IP address field. For example, the field dividing module can be configured to sub-divide an IP address field if the sequentially measured quantity of missing IP addresses between a pair of adjacent IP addresses exceeds a threshold quantity. The field dividing module can sub-divide the IP address field according to the pair of adjacent IP addresses (e.g., which have a number of missing IP addresses therebetween that exceeds a threshold quantity).

Figure 10:
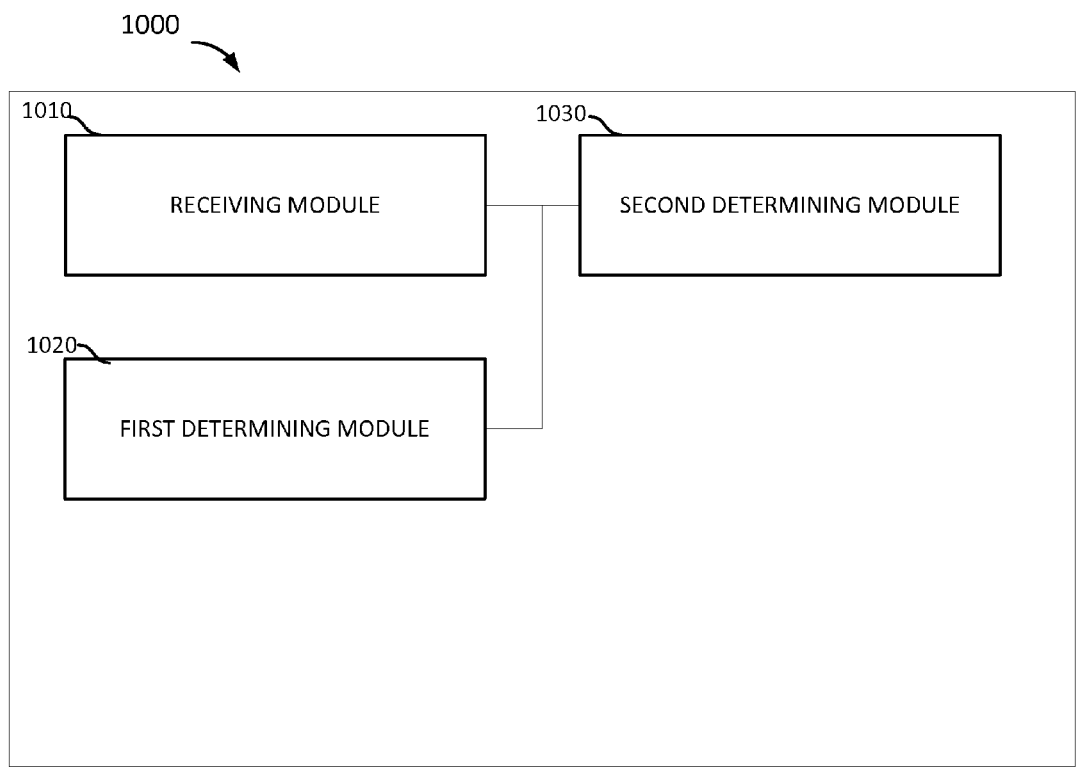
FIG. 10 is a structural diagram of a device for determining the geographic coordinates corresponding to to-be-measured IP addresses according to various embodiments of the present disclosure.

FIG. 10 is a structural diagram of a device for determining the geographic coordinates corresponding to to-be-measured IP addresses according to various embodiments of the present disclosure.

Referring to FIG. 10, a device 1000 for determining the geographic coordinates corresponding to to-be-measured IP addresses is provided. In some embodiments, the device 1000 can implement method 700 of FIG. 7. In some embodiments, the device 1000 corresponds to the server 820 of FIG. 8.

In some embodiments, the device 1000 includes a receiving module 1010, a first determining module 1020, and a second determining module 1030.

In some embodiments, the receiving module 1010 can receive an IP address. The IP address can be received in connection with a location-based application or service. For example, the receiving module 1010 can receive an IP address for which geographic coordinates are to be determined. The receiving module 1010 can receive a plurality of IP addresses for which respective locations are to be determined.

In some embodiments, the first determining module 1020 can determine an IP address field corresponding to the IP address. The first determining module 1020 can determine the IP address field to which the IP addresses belong among the multiple IP address fields. The IP address fields can be obtained according to, or otherwise determined by, device 900 described above.

In some embodiments, the second determining module 1030 can determine a location corresponding to the IP address. For example, the second determining module 1030 can determine geographic coordinates of a terminal accessing the Internet using the IP address received by the receiving module 1010. The second determining module 1030 can determine the geographic coordinates of a terminal according to the IP address field to which the IP address of the terminal belongs. The geographic coordinates corresponding to the IP address field associated with the IP addresses obtained according to, or otherwise determined by, the device 900 described above are to be geographic coordinates corresponding to the IP addresses for which geographic coordinates are to be determined.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

Figure 11:
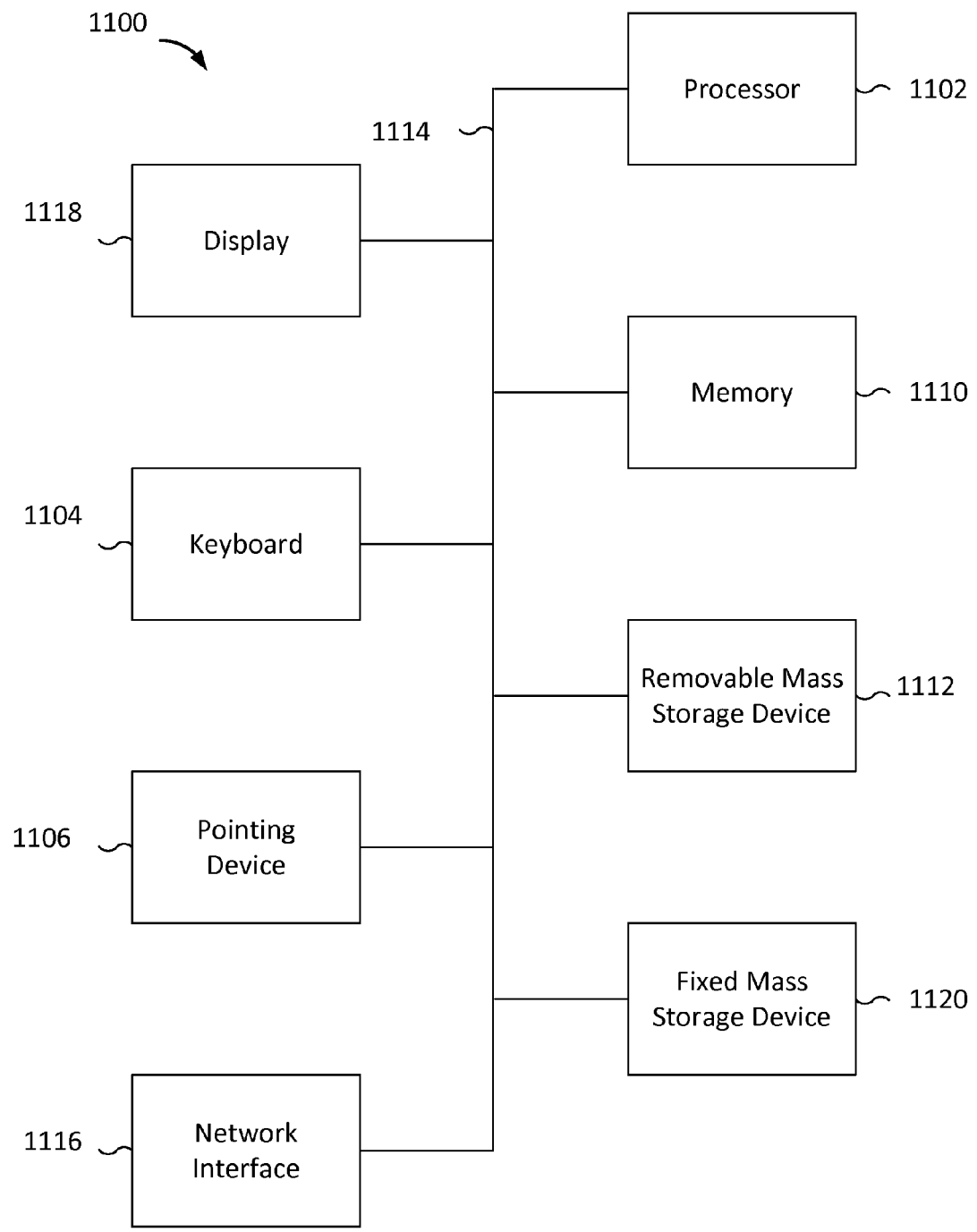
FIG. 11 is a functional diagram of a computer system for determining the geographic coordinates corresponding to IP addresses according to various embodiments of the present disclosure.

FIG. 11 is a functional diagram of a computer system for determining the geographic coordinates corresponding to IP addresses according to various embodiments of the present disclosure.

Referring to FIG. 11, a computer system 1100 for accessing a website or for determining whether a terminal accessing the website is a mobile terminal is provided. As will be apparent, other computer system architectures and configurations can be used to implement video calls. Computer system 1100, which includes various subsystems as described below, includes at least one microprocessor subsystem (also referred to as a processor or a central processing unit (CPU)) 1102. For example, processor 1102 can be implemented by a single-chip processor or by multiple processors. In some embodiments, processor 1102 is a general purpose digital processor that controls the operation of the computer system 1100. Using instructions retrieved from memory 1110, the processor 1102 controls the reception and manipulation of input data, and the output and display of data on output devices (e.g., display 1118).

Processor 1102 is coupled bi-directionally with memory 1110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1102. Also as is well known in the art, primary storage typically includes basic operating instructions, program code, data, and objects used by the processor 1102 to perform its functions (e.g., programmed instructions). For example, memory 1110 can include any suitable computer-readable storage media, described below, depending on whether, for example, data access needs to be bi-directional or uni-directional. For example, processor 1102 can also directly and very rapidly retrieve and store frequently needed data in a cache memory (not shown).

A removable mass storage device 1112 provides additional data storage capacity for the computer system 1100, and is coupled either bi-directionally (read/write) or uni-directionally (read only) to processor 1102. For example, storage 1112 can also include computer-readable media such as magnetic tape, flash memory, PC-CARDS, portable mass storage devices, holographic storage devices, and other storage devices. A fixed mass storage 1120 can also, for example, provide additional data storage capacity. The most common example of mass storage 1120 is a hard disk drive. Mass storage device 1112 and fixed mass storage 1120 generally store additional programming instructions, data, and the like that typically are not in active use by the processor 1102. It will be appreciated that the information retained within mass storage device 1112 and fixed mass storage 1120 can be incorporated, if needed, in standard fashion as part of memory 1110 (e.g., RAM) as virtual memory.

In addition to providing processor 1102 access to storage subsystems, bus 1114 can also be used to provide access to other subsystems and devices. As shown, these can include a display monitor 1118, a network interface 1116, a keyboard 1104, and a pointing device 1106, as well as an auxiliary input/output device interface, a sound card, speakers, and other subsystems as needed. For example, the pointing device 1106 can be a mouse, stylus, track ball, or tablet, and is useful for interacting with a graphical user interface.

The network interface 1116 allows processor 1102 to be coupled to another computer, computer network, or telecommunications network using a network connection as shown. For example, through the network interface 1116, the processor 1102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1102 can be used to connect the computer system 1100 to an external network and transfer data according to standard protocols. For example, various process embodiments disclosed herein can be executed on processor 1102, or can be performed across a network such as the Internet, intranet networks, or local area networks, in conjunction with a remote processor that shares a portion of the processing. Additional mass storage devices (not shown) can also be connected to processor 1102 through network interface 1116.

An auxiliary I/O device interface (not shown) can be used in conjunction with computer system 1100. The auxiliary I/O device interface can include general and customized interfaces that allow the processor 1102 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 11 is but an example of a computer system suitable for use with the various embodiments disclosed herein. Other computer systems suitable for such use can include additional or fewer subsystems. In addition, bus 1114 is illustrative of any interconnection scheme serving to link the subsystems. Other computer architectures having different configurations of subsystems can also be utilized.

The methods or process steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method comprising:
  collecting an Internet Protocol (IP) address and location information corresponding to the IP address, wherein the location information corresponding to the IP address includes information identifying a location from which a terminal associated with the IP address accesses a network;
  obtaining one or more pieces of IP address geographic coordinate data for the IP address using the IP address and the location information corresponding to the IP address;
  determining geographic coordinates corresponding to the IP address based at least in part on the one or more pieces of IP address geographic coordinate data;

determining an IP address set based at least in part on the geographic coordinates corresponding to the IP address; and determining a location corresponding to the IP address set.

2. The method of claim 1, wherein the IP address and location information corresponding to the IP address being collected is among a plurality of IP addresses and location information is respectively corresponding to the plurality of IP addresses.

3. The method of claim 2, wherein the IP address set being determined is among a plurality of IP address sets determined based at least in part on respective geographic coordinates corresponding to each of the plurality of IP addresses.

4. The method of claim 3, wherein the determining of the IP address set comprises segmenting the plurality of IP addresses into the plurality of IP address sets.

5. The method of claim 2, wherein the determining of the geographic coordinates corresponding to the IP address based at least in part on the one or more pieces of IP address geographic coordinate data comprises:

determining, for each of the plurality of IP addresses, a respective weight of each of the one or more pieces of IP address geographic coordinate data corresponding to a particular IP address of the plurality of IP addresses; and determining the geographic coordinates corresponding to the particular IP address based at least in part on the weight of each of the one or more pieces of IP address geographic coordinate data corresponding to the particular IP address.

6. The method of claim 5, wherein the determining, for each IP address, the weight of each of the one or more pieces of IP address geographic coordinate data corresponding to the particular IP address comprises: acquiring the one or more pieces of IP address geographic coordinate data that occur s within a predetermined range of locations corresponding to the IP address; and determining the weight of each of the one or more pieces of IP address geographic coordinate data according to a number of days on which one or more pieces of IP address geographic coordinate data occur within the predetermined range of locations.

7. The method of claim 5, wherein the determining of the geographic coordinates corresponding to the particular IP address based at least in part on the weight of each of the one or more pieces of IP address geographic coordinate data corresponding to the particular IP address comprises:

determining geographic coordinates in the IP address geographic coordinate data having a greatest weight among the one or more pieces of IP address geographic coordinate data corresponding to the particular IP address to be the geographic coordinates corresponding to the particular IP address.

8. The method of claim 5, wherein the determining of the geographic coordinates corresponding to the particular IP address based at least in part on the weight of each of the one or more pieces of IP address geographic coordinate data corresponding to the particular IP address comprises:

extracting a threshold number of pieces of IP address geographic coordinate data having greatest weight among one or more pieces of IP address geographic coordinate data corresponding to the particular IP address; and determining the geographic coordinates corresponding to the particular IP address based at least in part on distances between locations corresponding to the threshold number of pieces of IP address geographic coordinate data having the greatest weight.

9. The method of claim 3, wherein the determining of the plurality of IP address sets based at least in part on respective geographic coordinates corresponding to each of the plurality of IP addresses comprises:

ranking the collected IP addresses according to a predetermined order;

determining a respective distance between the corresponding geographic coordinates corresponding to each pair of adjacent IP addresses of the ranked collected IP addresses; and dividing the collected IP addresses into the plurality of IP address sets according to the respective distances between the geographic coordinates corresponding to each pair of adjacent IP addresses.

10. The method of claim 9, wherein the dividing of the plurality of collected IP addresses into the plurality of IP address sets according to the respective distances between the geographic coordinates corresponding to each pair of adjacent IP addresses comprises: regarding a smaller IP address of two adjacent IP addresses which are an nth pair of adjacent IP addresses whose adjacent distance exceeds a threshold distance as an ending IP address of an nth IP address set; regarding a larger IP address of two adjacent IP addresses which are an (n−1)th pair of adjacent IP addresses whose adjacent distance exceeds the threshold distance as a beginning IP address of the nth IP address set; and determining based on the nth IP address set, wherein n is an integer greater than or equal to 1 and wherein, when n is equal to 1, the first IP address is regarded as the starting IP address of the 1st IP address set.

11. The method of claim 9, wherein the dividing of the collected IP addresses into the plurality of IP address sets according to the respective distances between the geographic coordinates corresponding to each pair of adjacent IP addresses comprises:

determining a mean distance between the geographic coordinates corresponding to each particular IP address in a particular IP address set and the geographic coordinates corresponding to an IP address before the particular IP address to determine whether the mean distance exceeds a threshold mean distance; and in the event that the mean distance exceeds the threshold mean distance, determining all IP addresses arranged in order before the particular IP address within the particular IP address set to be a new IP address set, wherein the IP address before the particular IP address is regarded as an ending IP address of the new IP address set and the original starting IP address of the particular IP address set is regarded as a starting IP address of the new IP address set, and wherein the particular IP address and all the IP addresses arranged in order following the particular IP address are determined to belong to another new IP address set, wherein the particular IP address is regarded as a starting IP address of the other new IP address set and the ending IP address of the particular IP address set is regarded as an ending IP address of the other new IP address set.

12. The method of claim 9, further comprising:

measuring a quantity of missing IP addresses between each pair of adjacent IP addresses in a particular IP address set; and in the event that the measured quantity of missing IP addresses between a particular pair of adjacent IP addresses exceeds a threshold quantity, further dividing the particular IP address set according to the particular pair of adjacent IP addresses.

13. The method of claim 1, wherein the determining of the location further comprises:
- receiving an IP address for which a location is to be determined;
- determining the IP address set to which the IP address for which the location is to be determined belongs; and
- determining the geographic coordinates corresponding to the IP address set associated is with the IP address for which the location is to be determined.

14. The method of claim 1, further comprising:
sending, to a user, context-based information according to the location corresponding to the IP address set.

15. The method of claim 14, wherein the context-based information corresponds to one of a product and a service available within a predetermined range of geographic locations in which the location corresponding to the IP address set is located.

16. A device comprising:
- a collecting module configured to collect an IP address and location information corresponding to the IP address, wherein the location information corresponding to the IP address includes information identifying a location from which a terminal associated with the IP address accesses a network;
- a processing module configured to obtain one or more pieces of IP address geographic coordinate data for the IP address using the IP address and the location information corresponding to the IP address;
- a first determining module configured to determine geographic coordinates corresponding to the IP address based at least in part on the one or more pieces of IP address geographic coordinate data;
- an IP address set-dividing module configured to determine an IP address set based at least in part on the geographic coordinates corresponding to the IP address; and
- a second determining module configured to determine a location corresponding to the IP address set.

17. The device of claim 16, further comprising:
- a receiving module configured to receive an IP address for which a location is to be determined;
- the first determining module configured to determine the IP address set to which the IP address for which the location is to be determined belongs; and
- the second determining module configured to determine the geographic coordinates corresponding to the IP address set associated with the IP address for which a location is to be determined.

18. The device of claim 16, wherein the IP address and location information corresponding to the IP address collected by the collecting module is among a plurality of IP addresses and corresponding location information collected by the collecting module.

19. The device of claim 18, wherein the IP address set determined by the IP address set-dividing module is among a plurality of IP address sets determined, by the IP address set-dividing module, based at least in part on respective geographic coordinates corresponding to each of the plurality of IP addresses.

20. The device of claim 19, wherein the IP address set-dividing module segments the plurality of IP addresses into the plurality of IP address sets.

21. A computer program product, the computer program product being embodied in a tangible non-transitory computer-readable storage medium and comprising computer instructions that are executed to perform the steps of:
- collecting an IP address and location information corresponding to the IP address, wherein the location information corresponding to the IP address includes information identifying a location from which a terminal associated with the IP address accesses a network;
- obtaining one or more pieces of IP address geographic coordinate data for the IP address using the IP address and the location information corresponding to the IP address;
- determining geographic coordinates corresponding to the IP address based at least in part on the one or more pieces of IP address geographic coordinate data;
- determining an IP address set based at least in part on the geographic coordinates corresponding to the IP address; and
- determining a location corresponding to the IP address set.

22. The computer program product of claim 21, wherein the IP address and location information corresponding to the IP address being collected is among a plurality of IP addresses and location information respectively corresponding to the plurality of IP addresses.

23. The computer program product of claim 22, wherein the IP address set being determined is among a plurality of IP address sets determined based at least in part on respective geographic coordinates corresponding to each of the plurality of IP addresses.

24. The computer program product of claim 23, wherein the determining of the IP address set comprises segmenting the plurality of IP addresses into the plurality of IP address sets.

\* \* \* \* \*

UNITED STATES PATENT AND TRADEMARK OFFICE
CERTIFICATE OF CORRECTION

PATENT NO. : 9,813,309 B2
APPLICATION NO. : 14/657691
DATED : November 7, 2017
INVENTOR(S) : Li et al.

Page 1 of 1

It is certified that error appears in the above-identified patent and that said Letters Patent is hereby corrected as shown below:

In the Claims

In Column 29, Claim 2, Line 9, after "information", delete "is".
In Column 29, Claim 6, Line 38, after "occur", delete "s".
In Column 31, Claim 13, Line 8, after "associated", delete "is".

Signed and Sealed this
Twenty-seventh Day of March, 2018

Andrei Iancu
*Director of the United States Patent and Trademark Office*